(12) United States Patent  
Zhang et al.

(10) Patent No.: US 12,193,003 B2  
(45) Date of Patent: Jan. 7, 2025

(54) DISCONTINUOUS RECEPTION DRX PARAMETER CONFIGURATION METHOD AND APPARATUS

(71) Applicant: Huawei Technologies Co., Ltd., Shenzhen (CN)

(72) Inventors: Mengchen Zhang, Beijing (CN); Haibo Xu, Beijing (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 370 days.

(21) Appl. No.: 17/791,379

(22) PCT Filed: Jan. 7, 2021

(86) PCT No.: PCT/CN2021/070649  
§ 371 (c)(1),  
(2) Date: Jul. 7, 2022

(87) PCT Pub. No.: WO2021/139719  
PCT Pub. Date: Jul. 15, 2021

(65) Prior Publication Data  
US 2023/0034294 A1  Feb. 2, 2023

(30) Foreign Application Priority Data  
Jan. 8, 2020  (CN) .......................... 202010019617.3

(51) Int. Cl.  
*H04W 72/12* (2023.01)  
*H04W 72/20* (2023.01)  
*H04W 76/28* (2018.01)

(52) U.S. Cl.  
CPC .......... *H04W 72/20* (2023.01); *H04W 76/28* (2018.02)

(58) Field of Classification Search  
CPC ............ H04L 5/0091; H04W 52/0216; H04W 52/0219; H04W 52/0229; H04W 52/0251;  
(Continued)

(56) References Cited

U.S. PATENT DOCUMENTS

| 2015/0055532 A1 | 2/2015 | Lu et al. |
| 2019/0174411 A1 | 6/2019 | Xu et al. |

(Continued)

FOREIGN PATENT DOCUMENTS

| CN | 104871635 A | 8/2015 |
| JP | 2019525607 A | 9/2019 |

(Continued)

OTHER PUBLICATIONS

R2-1916627, Ericsson, Miscellaneous non-controversial corrections Set IV, 3GPP TSG RAN WG2 #108, Dec. 5, 2019, 8 pages.

(Continued)

*Primary Examiner* — Robert J Lopata  
(74) *Attorney, Agent, or Firm* — Conley Rose, P.C.

(57) ABSTRACT

A discontinuous reception (DRX) parameter configuration method includes a first communication apparatus that sends data to a second communication apparatus on a sidelink based on a DRX parameter. The second communication apparatus determines an active time and a sleep period of the second communication apparatus based on the DRX parameter, and receives the data in the active time.

20 Claims, 12 Drawing Sheets

(58) Field of Classification Search
CPC ... H04W 52/028; H04W 72/20; H04W 76/14; H04W 76/28; Y02D 30/70
USPC .......................................................... 370/329
See application file for complete search history.

(56) References Cited

U.S. PATENT DOCUMENTS

| | | | |
|---|---|---|---|
| 2021/0059005 A1* | 2/2021 | Hosseini | H04W 76/11 |
| 2022/0174780 A1* | 6/2022 | Bao | H04W 76/28 |
| 2022/0408514 A1* | 12/2022 | Luo | H04W 76/28 |
| 2023/0209646 A1* | 6/2023 | Hosseini | H04W 76/28 370/329 |
| 2024/0155495 A1* | 5/2024 | Hosseini | H04W 72/23 |

FOREIGN PATENT DOCUMENTS

| | | |
|---|---|---|
| WO | 2015176251 A1 | 11/2015 |
| WO | 2017078783 A1 | 5/2017 |
| WO | 2018027821 A1 | 2/2018 |
| WO | 2018064477 A1 | 4/2018 |

OTHER PUBLICATIONS

R2-1808477, Huawei, HiSilicon, Correction to 38.321 on the power saving for pending SR of delay-tolerate service, 3GPP TSG RAN WG2 #102, May 11, 2018, 7 pages.

R2-1916123, LG Electronics inc., Remaining MAC issues and response to RAN1 LS, 3GPP TSG RAN WG2 #108, Nov. 8, 2019, 7 pages.

R1-1912020, vivo, Physical layer structure for NR sidelink, 3GPP TSG RAN WG1 #99, Nov. 9, 2019, 5 pages.

3GPP TS 23.287 V16.1.0, Dec. 2019, 3rd Generation Partnership Project; Technical Specification Group Services and System Aspects; Architecture enhancements for 5G System (5GS) to support Vehicle-to-Everything (V2X) services (Release 16), 51 pages.

3GPP TS 38.212 V15.7.0, Sep. 2019, 3rd Generation Partnership Project; Technical Specification Group Radio Access Network; NR; Multiplexing and channel coding(Release 15), 101 pages.

3GPP TS 38.214 V15.7.0, Sep. 2019, 3rd Generation Partnership Project; Technical Specification Group Radio Access Network; NR; Physical layer procedures for data (Release 15), 106 pages.

3GPP TS 38.321 V15.8.0, Dec. 2019, 3rd Generation Partnership Project; Technical Specification Group Radio Access Network; NR; Medium Access Control (MAC) protocol specification (Release 15), 78 pages.

3GPP TS 38.331 V15.8.0, Dec. 2019, 3rd Generation Partnership Project; Technical Specification Group Radio Access Network; NR; Radio Resource Control (RRC) protocol specification (Release 15), 532 pages.

R2-166255, Intel Corporation, Introduction of DRX over PC5, 3GPP TSG RAN WG2 Meeting #95bis, Kaohsiung, Oct. 10-14, 2016, 2 pages.

R2-167764, Intel Corporation, DRX in sidelink, 3GPP TSG RAN WG2 Meeting #96, Reno, USA, Nov. 14-18, 2016, 2 pages.

R2-1701309, Intel Corporation et al, DRX in sidelink, 3GPP TSG RAN WG2#97, Athens, Greece, Feb. 13-17, 2017, 2 pages.

R2-1703669, Huawei et al, DRX on PC5, 3GPP TSG RAN WG2#97bis, Spokane, USA, Apr. 3-7, 2017, 3 pages.

R2-1704718, Huawei et al, Some considerations about DRX on PC5, 3GPP TSG RAN WG2#98, Hangzhou, China, May 15-19, 2017, 4 pages.

R2-1703502, Intel Corporation et al, Di scontinuous reception over SL, 3GPP TSG RAN WG2#97bis, Spokane, USA, Apr. 3-7, 2017, 2 pages.

* cited by examiner

DISCONTINUOUS RECEPTION DRX PARAMETER CONFIGURATION METHOD AND APPARATUS

CROSS-REFERENCE TO RELATED APPLICATIONS

This is a U.S. National Stage of International Patent Application No. PCT/CN2021/070649 filed on Jan. 7, 2021, which claims priority to Chinese Patent Application No. 202010019617.3 filed on Jan. 8, 2020. The disclosures of the aforementioned applications are hereby incorporated by reference in their entireties.

TECHNICAL FIELD

Embodiments of this application relate to the communication field, and in particular, to a discontinuous reception DRX parameter configuration method and an apparatus.

BACKGROUND

In 5th generation mobile network (5th generation mobile network, 5G) new radio (new radio, NR), to reduce unnecessary power consumption of a terminal device, a discontinuous reception (discontinuous reception, DRX) mechanism is applied to a Uu interface, to help the terminal device in a radio resource control (radio resource control, RRC) connected mode save energy. The Uu interface is an interface between the terminal device and a network device (for example, a base station). A basic principle of DRX is as follows: A packet-based data flow is usually bursty. To be specific, the terminal device is scheduled in a period of time, in other words, there is data to be received, but the terminal device is not scheduled in a subsequent relatively long period of time. When the terminal device is not scheduled, power consumption of the terminal device may be reduced by stopping the terminal device from listening to a physical downlink control channel (physical downlink control channel, PDCCH), so that a battery service life of the terminal device can be prolonged.

Different from that the DRX mechanism is applied to the Uu interface, the DRX mechanism is not applied to a current 5G device-to-device (device to device, D2D) communication scenario. When a transmit end communicates with a receive end through a sidelink (sidelink), the transmit end transmits information to the receive end by using a configured resource, but the receive end continuously listens to, on the sidelink, to-be-received information. Consequently, the receive end excessively consumes power. Therefore, currently, a method for reducing power consumption of the receive end in the D2D scenario is urgently needed.

SUMMARY

Embodiments of this application provide a discontinuous reception DRX parameter configuration method and an apparatus, to resolve a problem that power consumption of a receive end is high because the receive end continuously listens to information in a D2D scenario.

To achieve the foregoing objective, the following technical solutions are used in the embodiments of this application.

According to a first aspect, a discontinuous reception DRX parameter configuration method is provided. The method is applied to a device-to-device D2D communication scenario, and the method includes: A first communication apparatus obtains a first DRX parameter, where the first DRX parameter is used by the first communication apparatus to send data to a second communication apparatus on a sidelink based on the first DRX parameter; and the first communication apparatus sends the first DRX parameter to the second communication apparatus.

Therefore, in this embodiment of this application, on the sidelink, the second communication apparatus serving as a data receive end may determine an active time and a sleep period of the second communication apparatus based on the first DRX, and receive the data only in an active time. In this way, the second communication apparatus serving as the data receive end may not need to continuously listen to to-be-received information on the sidelink, to help the data receive end reduce power consumption and save power.

In a possible design, that a first communication apparatus obtains a first DRX parameter includes: The first communication apparatus receives the first DRX parameter from a first network device. The first communication apparatus is within a coverage area of the first network device. That is, the first DRX may be configured by a network device at a data transmit end. For example, the first DRX parameter is configured by a first base station corresponding to the first communication apparatus. The first base station may determine the first DRX parameter based on a current available resource, so that the first DRX parameter may meet resource allocation of the first base station, and the first communication apparatus sends the data to the second communication apparatus on a resource allocated by the first base station.

In a possible design, before that the first communication apparatus receives the first DRX parameter from a first network device, that a first communication apparatus obtains a first DRX parameter further includes: The first communication apparatus sends auxiliary information and an identifier of the second communication apparatus to the first network device. The auxiliary information is used by the first network device to determine the first DRX parameter with reference to the auxiliary information. The first communication apparatus serving as a data receive end knows a condition under which data is sent. Therefore, in this application, the first communication apparatus may send the auxiliary information to the first network device, and the first network device determines, based on the auxiliary information, a DRX parameter corresponding to the second communication apparatus, so that the second communication apparatus may determine, based on the configured DRX parameter, duration in which the second communication apparatus is in an active time and duration in which the second communication apparatus is in a sleep period (duration of an inactive time), and receive the data in the duration in which the second communication apparatus is in an active time. In this way, if the second communication apparatus and the first communication apparatus are not within a coverage area of a same network device, in a D2D scenario, both the first communication apparatus and the first network device may store the DRX parameter of the second communication apparatus, the first network device may schedule data based on the DRX parameter, and the first communication apparatus may send the data to the second communication apparatus based on the DRX parameter. In addition, the second communication apparatus serving as the data receive end may not need to be always in a data listening state, so that power consumption of the second communication apparatus can be reduced, and power of the second communication apparatus is saved.

In a possible design, the auxiliary information includes a data transmission requirement of the first communication apparatus on the sidelink; the auxiliary information includes a second DRX parameter determined by the first communication apparatus based on a data transmission requirement of the first communication apparatus on the sidelink; or the auxiliary information includes a data transmission requirement of the first communication apparatus on the sidelink and a second DRX parameter determined by the first communication apparatus based on the data transmission requirement. The data transmission requirement may be QoS required by the first communication apparatus.

For example, if a service that the first communication apparatus needs to communicate with the second communication apparatus on the sidelink has a relatively high QoS requirement, and low-latency data transmission needs to be performed, the first network device may determine that in a DRX cycle corresponding to the first DRX parameter, duration of a sleep period is relatively short, and duration of an active time is relatively long. In this way, when the first communication apparatus needs to send data, the second communication apparatus may wake up in time and receive, in an active time, the data sent by the first communication apparatus. This meets a low latency requirement. If the auxiliary information includes the second DRX parameter, and the second DRX parameter meets that in a DRX cycle, duration of a sleep period is relatively short and duration of an active time is relatively long, the first network device may use the second DRX parameter as the first DRX parameter; otherwise, the first network device may re-determine a first DRX parameter based on the QoS, so that the first DRX parameter meets the low-latency requirement.

In a possible design, that a first communication apparatus obtains a first DRX parameter includes: The first communication apparatus determines, based on a data transmission requirement of the first communication apparatus on a device-to-device D2D communication sidelink, the first DRX parameter that is to be configured for the second communication apparatus. That is, the first communication apparatus serving as a data transmit end configures the first DRX parameter of the second communication apparatus serving as the data receive end. In this way, when the first communication apparatus sends the data to the second communication apparatus, the first DRX parameter may meet the data transmission requirement of the first communication apparatus.

In a possible design, the method further includes: The first communication apparatus sends the first DRX parameter and an identifier of the second communication apparatus to a first network device. After determining the first DRX parameter, the first communication apparatus may also send the determined first DRX parameter to the first network device, so that when the first network device determines that there is data to be transmitted by the first communication apparatus, the first network device may allocate a resource to the first communication apparatus with reference to the first DRX parameter.

In a possible design, the method further includes: The first communication apparatus stores the first DRX parameter, and establishes a correspondence between the first DRX parameter and an identifier of the second communication apparatus. Because the first communication apparatus may establish sidelink connections to a plurality of second communication apparatuses serving as data receive ends, the first communication apparatus may establish a correspondence between the first DRX parameter and an identifier of the second communication apparatus, so that the first communication apparatus may determine, based on the correspondence, a first DRX parameter of a second receive end that is to perform data communication. The identifier may be a layer 2 ID.

In a possible design, the method further includes: The first communication apparatus receives a first notification message sent by the second communication apparatus, where the first notification message indicates that configuration of the first DRX parameter is completed; and the first communication apparatus sends a second notification message to the first network device, where the second notification message indicates that the configuration of the first DRX parameter is completed. When the first network device receives the second notification message, if the first communication apparatus has data to be sent, the first communication apparatus may apply to the first network device for a resource, to send the data to the second communication apparatus on the applied resource.

In a possible design, the method further includes: The first communication apparatus receives downlink control information DCI from a first network device, where the DCI includes an identifier of a third communication apparatus that is determined by the first network device based on a scheduling request sent by the first communication apparatus, and information about a resource that is allocated to the first communication apparatus and the third communication apparatus and that is determined based on a first DRX parameter of the third communication apparatus; and the first communication apparatus sends sidelink control information SCI to the third communication apparatus, Where the SCI includes the information about the resource, and the information about the resource is used by the third communication apparatus to receive, on the resource indicated by the information about the resource, data sent by the first communication apparatus. The third communication apparatus is a data receive end that is in an active time and that is determined by the first network device based on the first DRX parameter. Therefore, when the first communication apparatus sends the data on the resource allocated by the first network device, the third communication apparatus is in an active time, and the third communication apparatus may receive the data on the resource allocated by the first network device. In addition, the third communication apparatus does not need to be always in a state of monitoring whether there is data to be received, to save power of the third communication apparatus.

In a possible design, the method further includes: The first communication apparatus receives DCI from a first network device, where the DCI includes information about a resource that is available on the sidelink and that is allocated to the first communication apparatus; the first communication apparatus determines, based on first DRX parameters of a plurality of communication apparatuses connected to the first communication apparatus and the information about the resource, at least one communication apparatus that is in an active time in the communication apparatuses connected to the first communication apparatus; the first communication apparatus determines a third communication apparatus with a highest logical channel priority from the at least one communication apparatus; and the first communication apparatus sends SCI to the third communication apparatus, where the SCI includes the information about the resource, and the information about the resource is used by the third communication apparatus to receive, on the resource indicated by the information about the resource, data sent by the first communication apparatus. In this way, when the first communication apparatus receives the information about the resource allocated by the first network device, the first communication apparatus may determine, based on the first DRX parameter and the information about the resource, the third communication apparatus that is in an active time and that has the highest logical channel priority, so that when the first communication apparatus sends data on the resource indicated by the information about the resource, the third communication apparatus is in an active time, and the third communication apparatus can receive the data on the resource. This can ensure that data on a logical channel with a highest priority is received in time, and the third communication apparatus does not need to be always in a state of monitoring whether there is data to be received, to save power of the third communication apparatus.

In a possible design, the method further includes: The first communication apparatus determines a first sidelink with a highest logical channel priority from all sidelinks on which connections are established, and determines a first DRX parameter of a third communication apparatus connected to the first communication apparatus on the first sidelink; the first communication apparatus determines, from a resource pool based on the first DRX parameter of the third communication apparatus, information about a resource on which the third communication apparatus is in an active time; and the first communication apparatus sends SCI to the third communication apparatus. The SCI includes the information about the resource, and the information about the resource is used by the third communication apparatus to receive, on the resource indicated by the information about the resource, data sent by the first communication apparatus. In this way, when the first communication apparatus determines the first sidelink corresponding to a logical channel with a highest priority, the first communication apparatus may determine, from the resource pool based on the first DRX that corresponds to the third communication apparatus serving as a data receive end on the first sidelink, the resource on which the third communication apparatus is in an active time. That is, the first communication apparatus may determine an active time and a sleep period of the third communication apparatus based on the first DRX parameter, to send the data to the third communication apparatus on the resource on which the third communication apparatus is in an active time. The third communication apparatus may receive, on the resource, the data sent by the first communication apparatus, and the third communication apparatus does not need to be always in a state of monitoring whether there is data to be received, to save power of the third communication apparatus.

In a possible design, the first communication apparatus is a terminal device or a communication chip, and the second communication apparatus is a terminal device or a communication chip.

According to a second aspect, a discontinuous reception DRX parameter configuration method is provided. The method is applied to a device-to-device D2D communication scenario, and the method includes: A first network device determines a first DRX parameter, where the first DRX parameter is used by a first communication apparatus to send data to a second communication apparatus on a sidelink based on the first DRX parameter; and the first network device sends the first DRX parameter to the first communication apparatus. In this way; both the first network device and the first communication apparatus store the first DRX parameter of the second communication apparatus. If the second communication apparatus and the first communication apparatus are not within a coverage area of a same network device, in a D2D scenario, the first network device may schedule data based on the first DRX parameter, and the first communication apparatus may send the data to the second communication apparatus based on the first DRX, parameter. In addition, the second communication apparatus serving as a data receive end may not need to be always in a data listening state, so that power consumption of the second communication apparatus can be reduced, and power of the second communication apparatus is saved.

In a possible design, before that a first network device determines a first DRX parameter, the method further includes: The first network device receives auxiliary information and an identifier of the second communication apparatus that are sent by the first communication apparatus. The auxiliary information is used by the first network device to determine the first DRX parameter with reference to the auxiliary information; and the first communication apparatus is within a coverage area of the first network device. Therefore, when the first network device determines the first DRX parameter, the first network device may determine the first DRX parameter with reference to the auxiliary information sent by the first communication apparatus, so that the determined first DRX parameter may meet a data transmission requirement of the first communication apparatus.

In a possible design, the auxiliary information includes a data transmission requirement of the first communication apparatus on the sidelink; the auxiliary information includes a second DRX parameter determined by the first communication apparatus based on a data transmission requirement of the first communication apparatus on the sidelink; or the auxiliary information includes a data transmission requirement of the first communication apparatus on the sidelink and a second DRX parameter determined by the first communication apparatus based on the data transmission requirement. The data transmission requirement may be quality of service QoS required by a service of the first communication apparatus on the sidelink. For example, if a service that the first communication apparatus needs to communicate with the second communication apparatus on the sidelink has a relatively high QoS requirement, and low-latency data transmission needs to be performed, the first network device may determine that in a DRX cycle corresponding to the first DRX parameter, duration of a sleep period is relatively short, and duration of an active time is relatively long. In this way, when the first communication apparatus needs to send data, the second communication apparatus may wake up in time and receive, in an active time, the data sent by the first communication apparatus. This meets a low latency requirement. If the auxiliary information includes the second DRX parameter, and the second DRX parameter meets that in a DRX cycle, duration of a sleep period is relatively short and duration of an active time is relatively long, the first network device may use the second DRX parameter as the first DRX parameter; otherwise, the first network device may re-determine a first DRX parameter based on the QoS, so that the first DRX parameter meets the low-latency requirement.

In a possible design, before that a first network device determines a first DRX parameter, the method further includes: The first network device sends a request message to a second network device. The request message is used to request to obtain a third DRX parameter, and the third DRX parameter is a DRX parameter that is of a Uu interface and that is configured by the second network device for the second communication apparatus: and the second communication apparatus is within a coverage area of the second network device. That a first network device determines a first DRX parameter includes: The first network device determines the first DRX parameter with reference to the third DRX parameter. If the first communication apparatus and the second communication apparatus are not within a coverage area of a same network device, that is, the first communication apparatus is within a coverage area of the first network device, and the second communication apparatus is within a coverage area of the second network device, the first network device may request, from the second network device, a third DRX parameter that is of a Uu interface and that is configured by the second network device for the second communication apparatus. A first network configures a first DRX parameter of a PC5 interface for the second communication apparatus with reference to the third DRX parameter, so that duration in which the second communication apparatus is in an active time and duration in which the second communication apparatus is in a sleep period on the two interfaces may be the same as much as possible. In this way, when there is data to transmitted, the second communication apparatus saves power based on the third DRX parameter, in addition, when the first communication apparatus and the second communication apparatus are within coverage areas of different network devices, because the third DRX parameter of the PC5 interface of the second communication apparatus is aligned with the first DRX parameter of the Uu interface of the second communication apparatus, power of the second communication apparatus can be further saved.

In a possible design, the method further includes: The first network device sends downlink control information DCI to the first communication apparatus. The DCI includes an identifier of a third communication apparatus that is in an active time and that is determined by the first network device based on the first DRX parameter, and information about a resource that is available on the sidelink and that is allocated to the first communication apparatus. The third communication apparatus is a data receive end that is in an active time and that is determined by the first network device based on the first DRX parameter. Therefore, when the first communication apparatus sends the data on the resource allocated by the first network device, the third communication apparatus is in an active time, and the third communication apparatus may receive the data on the resource allocated by the first network device. In addition, the third communication apparatus does not need to be always in a state of monitoring whether there is data to be received, to save power of the third communication apparatus.

In a possible design, the first communication apparatus is a terminal device or a communication chip, and the second communication apparatus is a terminal device or a communication chip.

According to a third aspect, a discontinuous reception DRX parameter configuration method is provided. The method includes: A second communication apparatus receives a first DRX parameter from a first communication apparatus, where the first DRX parameter is used by the second communication apparatus to receive, on a sidelink based on the first DRX parameter, data sent by the first communication apparatus; and the second communication apparatus performs data communication with the first communication apparatus based on the first DRX parameter. In this way, in a D2D scenario, the second communication apparatus may not need to continuously listen to data on the sidelink, and may receive the data in an active time based on the first DRX parameter, to save power of the second communication apparatus.

In a possible design, the method further includes: The second communication apparatus receives sidelink control information SCI from the first communication apparatus. The SCI includes information about a resource, and the information about the resource is used by the second communication apparatus to receive, on the resource indicated by the information about the resource, data sent by the first communication apparatus. In this way, the second communication apparatus may receive, on the information about the resource indicated by the SCI, the data sent by the first communication apparatus. To be specific, when the first communication apparatus sends the data to the second communication apparatus on the resource, the second communication apparatus may receive, on the resource in an active time, the data sent by the first communication apparatus, to save power of the third communication apparatus.

In a possible design, the first communication apparatus is a terminal device or a communication chip, and the second communication apparatus is a terminal device or a communication chip.

According to a fourth aspect, a communication apparatus is provided, is applied to a device-to-device D2D communication scenario, and includes: a processing unit, configured to obtain a first DRX parameter, where the first DRX parameter is used by a first communication apparatus to send data to a second communication apparatus on a sidelink based on the first DRX parameter; and a sending unit, configured to send the first DRX parameter to the second communication apparatus.

According to a fifth aspect, a network device is provided, is applied to a device-to-device D2D communication scenario, and includes: a processing unit, configured to determine a first DRX parameter, where the first DRX parameter is used by a first communication apparatus to send data to a second communication apparatus on a sidelink based on the first DRX parameter; and a sending unit, configured to send the first DRX parameter to the first communication apparatus.

According to a sixth aspect, a communication apparatus is provided, is applied to a device-to-device D2D communication scenario, and includes a receiving unit, configured to receive a first DRX parameter from a first communication apparatus. The first DRX parameter is used by a second communication apparatus to receive, on a sidelink based on the first DRX parameter, data sent by the first communication apparatus. The receiving unit is further configured to perform data communication with the first communication apparatus based on the first DRX parameter.

According to a seventh aspect, a communication system is provided, is applied to a device-to-device D2D communication scenario, and includes the communication apparatus according to the fourth aspect, the network device according to the fifth aspect, and the communication apparatus according to the sixth aspect.

According to an eighth aspect, a communication apparatus is provided, is applied to a device-to-device D2D communication scenario, and includes: a processor, coupled to a memory; and the memory, configured to store a computer program or instructions. The processor is configured to execute the computer program or the instructions stored in the memory, so that the apparatus is enabled to perform the method according to any one of the first aspect and the possible designs of the first aspect.

According to a ninth aspect, a communication apparatus is provided, is applied to a device-to-device D2D communication scenario, and includes: a processor, coupled to a memory; and the memory, configured to store a computer program or instructions. The processor is configured to execute the computer program or the instructions stored in the memory, so that the apparatus is enabled to perform the method according to any one of the second aspect and the possible designs of the second aspect.

According to a tenth aspect, a communication apparatus is provided, is applied to a device-to-device D2D communication scenario, and includes: a processor, coupled to a memory; and the memory, configured to store a computer program or instructions. The processor is configured to execute the computer program or the instructions stored in the memory, so that the apparatus is enabled to perform the method according to any one of the third aspect and the possible designs of the third aspect.

According to an eleventh aspect, a communication system is provided, including the communication apparatus according to the eighth aspect, the network device according to the ninth aspect, and the communication apparatus according to the tenth aspect.

According to a twelfth aspect, a computer-readable storage medium is provided, including a program or instructions. When the program or the instructions is/are run by a processor, the method according to any one of the first aspect and the possible designs of the first aspect is performed.

According to a thirteenth aspect, a computer-readable storage medium is provided, including a program or instructions. When the program or the instructions is/are run by a processor, the method according to any one of the second aspect and the possible designs of the second aspect is performed.

According to a fourteenth aspect, a computer-readable storage medium is provided, including a program or instructions. When the program or the instructions is/are run by a processor, the method according to any one of the third aspect and the possible designs of the third aspect is performed.

According to a fifteenth aspect, a computer program product is provided. When the computer program product is run on a computer, an electronic device is enabled to perform the method according to any one of the first aspect and the possible designs of the first aspect.

According to a sixteenth aspect, a computer program product is provided. When the computer program product is run on a computer, an electronic device is enabled to perform the method according to any one of the second aspect and the possible designs of the second aspect.

According to a seventeenth aspect, a computer program product is provided. When the computer program product is run on a computer, an electronic device is enabled to perform the method according to any one of the third aspect and the possible designs of the third aspect.

DESCRIPTION OF EMBODIMENTS

Figure 1:
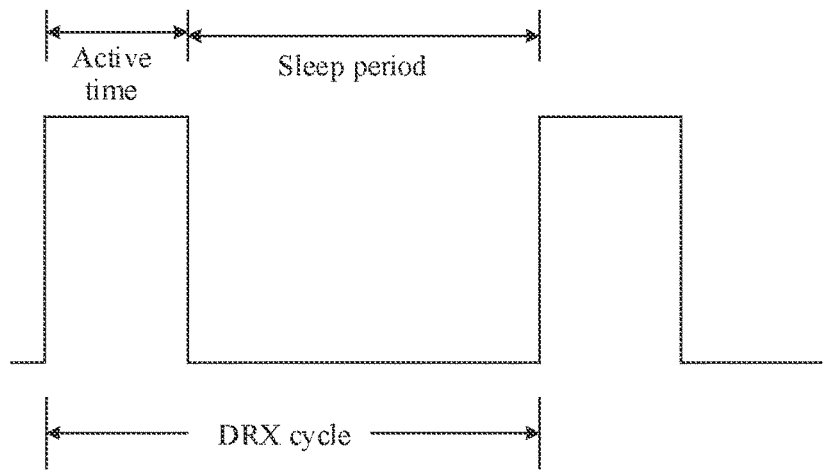
FIG. 1 is a schematic diagram of a DRX cycle according to an embodiment of this application.

For ease of understanding, example descriptions of some concepts related to embodiments of this application are provided for reference. Details are described as follows:

D2D is device-to-device, which is a communication manner in which two peer-to-peer user nodes directly communicate with each other and is also referred to as direct terminal communication. D2D is a new technology that allows, under control of a system, terminal devices to directly communicate with each other by sharing cell resources, to resolve, to some extent, a problem of lack of spectrum resources in a wireless communication system. The D2D technology may be applied to a mobile cellular network, to improve resource utilization and a network capacity. Resources occupied by each D2D communication link are equal to resources occupied by one cellular communication link.

Quality of service (quality of service, QoS) is a network security mechanism, and is a technology used to resolve problems such as network latency and congestion. In a conventional sense, the quality of service may include a transmission bandwidth, transmission latency, a data packet loss rate, and the like. Improving the quality of service may be to ensure the transmission bandwidth, reduce the transmission latency, reduce the data packet loss rate and latency jitter, and the like. In a broad sense, the quality of service involves all aspects of network applications. All measures that are beneficial to the network applications are to improve the quality of service. In this sense, firewalls, policy-based routing, and fast forwarding are also the measures to improve quality of network services.

A sidelink may be referred to as a side link, a direct-communication link, a secondary link, an edge link, or the like, and is a link introduced to support device-to-device direct communication. The sidelink may be applied to a D2D scenario, a vehicle-to-everything (vehicle-to-everything, V2X), and the like. In 5G NR, a sidelink mainly includes a physical sidelink control channel (physical sidelink control channel, PSCCH), a physical sidelink shared channel (physical sidelink shared channel, PSSCH), a physical sidelink broadcast channel (physical sidelink broadcast channel, PSCCH), a physical sidelink feedback channel (physical sidelink feedback channel, PSTCH), and the like.

Currently, sidelink communication has the following two resource allocation modes: working mode 1 and working mode 2. The two working modes are as follows:

Working mode 1: A terminal device transmits data in a radio resource control (radio resource control, RRC) connected mode. A transmission resource is controlled by a network device, for example, a base station. The base station schedules a transmission resource used to transmit control information and data of a sidelink. The terminal device sends a sidelink scheduling request (scheduling request, SR) and a sidelink buffer status report (buffer status report, BSR) to the base station. Based on the sidelink BSR, the base station may determine an amount of data for sidelink communication of the terminal device, and estimate a resource for transmission. The base station may use a configured sidelink-radio network temporary identifier (sidelink-radio network temporary identifier, SL-RNTI) to schedule a transmission resource used for sidelink communication.

Working mode 2: A terminal device selects a resource from a resource pool and selects a transmission format to send control information and data information of a sidelink. Once resource pool selection is performed, the selected resource is valid for an entire sidelink control period. After the sidelink control period ends, UE may perform resource pool selection again.

A working principle of DRX is as follows: As shown in FIG. 1, a basic mechanism of the DRX is to configure a DRX cycle (cycle) for UE in an RRC connected mode. The DRX cycle includes "on duration" (on duration) and an "opportunity for DRX" (opportunity for DRX). In duration of the "on duration", a terminal device may listen to and receive a PDCCH. In duration of the "opportunity for DRX", the UE does not receive the PDCCH, to reduce power consumption. In other words, in the duration of the on duration, the terminal device is in an active time and in the duration of the opportunity for DRX, the terminal device is in a sleep period.

A value of the on duration specifies duration of listening to the PDCCH from a start location of the DRX cycle, namely, duration corresponding to a parameter drx-onDurationTimer. In most cases, after the terminal device is scheduled on a PDCCH occasion (occasion), and receives or sends data, the terminal device is likely to be continuously scheduled in subsequent subframes. If the data needs to be received or sent in a next DRX cycle, extra latency is caused. To reduce this latency, after being scheduled, the terminal device may be continuously in an active time, that is, continuously listen to the PDCCH in a configured active time. An implementation mechanism is as follows: Each time the terminal device is scheduled to initially transmit a piece of new data, a timer drx-InactivityTimer is started (or restarted). In timing duration of the timer, the terminal device is always in an active time until the timer expires. The drx-InactivityTimer specifies duration in which the terminal device is continuously in an active time after the terminal device successfully decodes a PDCCH indicating uplink (uplink, UL) or downlink (downlink, DL) user data that is initially transmitted. In other words, when the terminal device is scheduled to initially transmit data, the timer is started or restarted once.

For hybrid automatic repeat request (hybrid automatic repeat request, HARQ) retransmission of data, because there is no fixed time sequence relationship between previous transmission and retransmission, a time window is separately defined for an uplink HARQ and a downlink HARQ, a HARQ round-trip time (round-trip time, RTT) timer allows the terminal device to start to listen to uplink or downlink retransmission only after the time window from previous uplink or downlink transmission. Each uplink HARQ process and each downlink HARQ process separately correspond to one HARQ RTT Timer. After drx-HARQ-RTT-TimerUL expires, for uplink transmission, the terminal device starts a DRX uplink retransmission timer (drx-RetransmissionTimerUL) for a corresponding HARQ process. For downlink transmission, if data in a corresponding HARQ process is not successfully received after drx-HARQ-RTT-TimerDL expires, the terminal device starts a DRX downlink retransmission timer (drx-RetransmissionTimerDL) for the HARQ process. When the drx-RetransmissionTimerUL or the drx-RetransmissionTimerDL runs, the terminal device listens to a PDCCH used to schedule HARQ retransmission.

When UE is configured with a DRX cycle, duration in which a terminal device is in an active time (active time) includes:

(1) duration in which drx-onDurationTimer, drx-InactivityTimer, drx-RetransmissionTimerUL, drx-RetransmissionTimerDL, or a contention resolution timer ra-ContentionResolutionTimer is running, or the like;

(2) duration in which the terminal device has sent an SR on a physical uplink control channel (physical uplink control channel, PUCCH), where the SR is currently in a pending state; and (3) duration in which the terminal device successfully receives a random access response (random access response, RAR) used to respond to a contention-based random access sequence (preamble) that is not selected by the terminal device, but does not receive a PDCCH indicating initial transmission (by using a cell radio network temporary identifier (Cell-Radio Network Temporary identifier, C-RNTI)).

The technical solutions in embodiments of this application may be applied to various communication systems such as a long term evolution (long term evolution, LTE) system, a worldwide interoperability for microwave access (worldwide interoperability for microwave access, WiMAX) communication system, a 5th generation (5th Generation, 5G) system such as a new radio access technology (new radio access technology, NR) system, a network that integrates a plurality of systems, an Internet of things system, an Internet of vehicles system, and a future communication system such as a 6G system. Specifically, this application may be applied to D2D communication scenarios of these communication systems. In other words, devices may directly communicate with each other by establishing a sidelink.

In addition, the term "for example" in embodiments of this application is used to represent giving an example, an illustration, or a description. Any embodiment or design solution described as an "example" in this application should not be explained as being more preferred or having more advantages than another embodiment or design solution. Specifically, the term "example" is used for presenting a concept in a specific manner.

In embodiments of this application, "of (of)", "corresponding (corresponding, relevant)", and "corresponding to (corresponding)" may be interchangeably used sometimes. It should be noted that meanings expressed by the terms are consistent when differences are not emphasized.

A network architecture and a service scenario described in embodiments of this application are intended to describe the technical solutions in embodiments of this application more clearly, and do not constitute a limitation on the technical solutions provided in embodiments of this application. A person of ordinary skill in the art may know that with the evolution of the network architecture and emergence of a new service scenario, the technical solutions provided in embodiments of this application are also applicable to similar technical problems.

In embodiments of this application, an NR network scenario in a wireless communication network is used as an example to describe some scenarios. It should be noted that the solutions in embodiments of this application may be further applied to another wireless communication network, and a corresponding name may also be replaced with a name of a corresponding function in the another wireless communication network.

Figure 2:
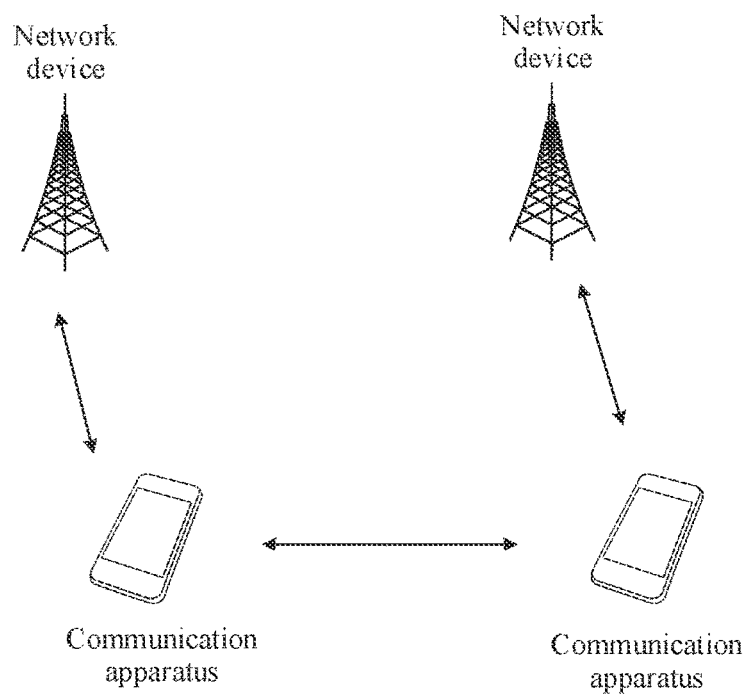
FIG. 2 is a schematic diagram of a structure of a network framework according to an embodiment of this application.

In a D2D communication scenario in embodiments of this application, as shown in FIG. 2, a network framework in this application may include at least one network device and at least two communication apparatuses.

The network device in embodiments of this application may be a device having a wireless transceiver function or a chip that can be disposed in the device, and may be deployed in a radio access network to provide a wireless communication service for a terminal device. The device includes but is not limited to: an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB, or a home NodeB, HNB), a baseband unit (baseband unit, BBU), an access point (access point, AP) in a wireless fidelity (wireless fidelity, Wi-Fi) system, a wireless relay node, a wireless backhaul node, a transmission point (transmission and reception point, TRP, or transmission point, TP), and the like. Alternatively, the network device may be a gNB or a transmission point (a TRP or a TP) in a 5G system such as an NR system; may be an antenna panel or a group of antenna panels (including a plurality of antenna panels) of a base station in a 5G system; or may be a network node, such as a baseband unit (BBU) or a distributed unit (distributed unit, DU), that constitutes a gNB or a transmission point. Alternatively, the network device is a vehicle-mounted device, a wearable device, a network device in a future evolved PLMN network, or the like.

The communication apparatus in embodiments of this application may be a terminal device or a communication chip. For example, the terminal device may be user equipment (User Equipment, UE), an access terminal, a subscriber unit, a subscriber station, a mobile station, a mobile console, a remote station, a remote terminal, a mobile device, a user terminal, a terminal, a wireless communication device, a user agent, or a user apparatus. The terminal device in embodiments of this application may be a mobile phone (mobile phone), a tablet computer (Pad), a computer with a wireless transceiver function, a virtual reality (virtual reality, VR) terminal device, an augmented reality (augmented reality, AR) terminal device, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), a terminal device in a 5G network, a terminal device in a future evolved public land mobile network (public land mobile network, PLMN), or the like. An application scenario is not limited in embodiments of this application. In this application, methods and steps that are implemented by the terminal device may also be implemented by a component (for example, a chip or a circuit) that may be used in the terminal device. In this application, the foregoing terminal device and the component (for example, the chip or the circuit) that may be disposed in the foregoing terminal device are collectively referred to as a terminal device.

It should be noted that UE at a data transmit end and UE at a data receive end may be within a coverage area of a same base station, or may be within coverage areas of different base stations.

For an application scenario and a network architecture of this application, for example, D2D may be applied to a plurality of local communication services, short-distance communication, or communication in a same room. For example, for a video service of a touring concert, an audience may download, on a terminal device (for example, a mobile phone) side by using wireless D2D, materials provided by the concert. By applying to a system cell (for example, a base station) for a D2D resource, a concert organizer may immediately transmit video information to a plurality of terminal devices. Compared with providing a video service by using a system cell base station, providing a video service in a D2D manner may reduce load of a cell base station. A system may provide a voice service and an Internet data service while performing D2D communication. Currently, the terminal device that receives video data continuously listens to to-be-received video data on a sidelink. Consequently, the terminal device at a receive end excessively consumes power.

For another example, the terminal device may be a mobile phone, a VR head-mounted display, and the like. After a sidelink connection is established between the mobile phone and the VR head-mounted display, the mobile phone may serve as a data transmit end, and the VR head-mounted display may serve as a data receive end. The mobile phone may send video data to the VR head-mounted display through the sidelink, and the VR head-mounted display may continuously listen to to-be-received video data on the sidelink. Consequently, the VR head-mounted display excessively consumes power.

In other words, after a transmit end and a receive end between devices establish a sidelink, currently, the receive end continuously listens to to-be-received data on the sidelink. Consequently, the receive end excessively consumes power. Currently, a base station may configure, for UE, a DRX parameter used for a Uu interface. Specifically, the base station may send configuration information to the UE, and the configuration information includes the DRX parameter used for Uu interface data transmission between the base station and the UE. However, in a D2D scenario, a transmit end user (transmit UE, Tx UE) and a receive end user (receive UE, Rx UE) are directly connected for data transmission, and the Rx UE may not be within a coverage area of a base station in which the Tx UE is located. If a base station connected to the Rx UE and a base station connected to the Tx UE are not a same base station, the base station connected to the Tx UE does not know a DRX parameter of the Rx UE. In the D2D scenario, this may cause a case in which the Tx UE sends data, but the Rx UE is not in an active time at this time, resulting in a data sending failure. Therefore, this application describes how to configure the DRX parameter when the Tx UE sends data to the Rx UE. For this problem, this application provides a DRX parameter configuration method. A basic principle of the method may be as follows: A transmit end configures a DRX parameter for a receive end, so that when the transmit end transmits data, the receive end may determine, based on the DRX parameter, duration in which the receive end is in an active time, and the receive end does not need to be always in the active time to listen to data. This can reduce power consumption of the receive end.

The following describes technical solutions in embodiments of this application with reference to the accompanying drawings in embodiments of this application. In the descriptions of embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of embodiments of this application, "a plurality of" means two or more than two.

The following terms "first" and "second" are only intended for a purpose of description, and shall not be understood as an indication or implication of relative importance or implicit indication of a quantity of indicated technical features. Therefore, a feature limited by "first" or "second" may explicitly or implicitly include one or more features. In the descriptions of the embodiments, unless otherwise specified, "a plurality of" means two or more than two.

Figure 3:
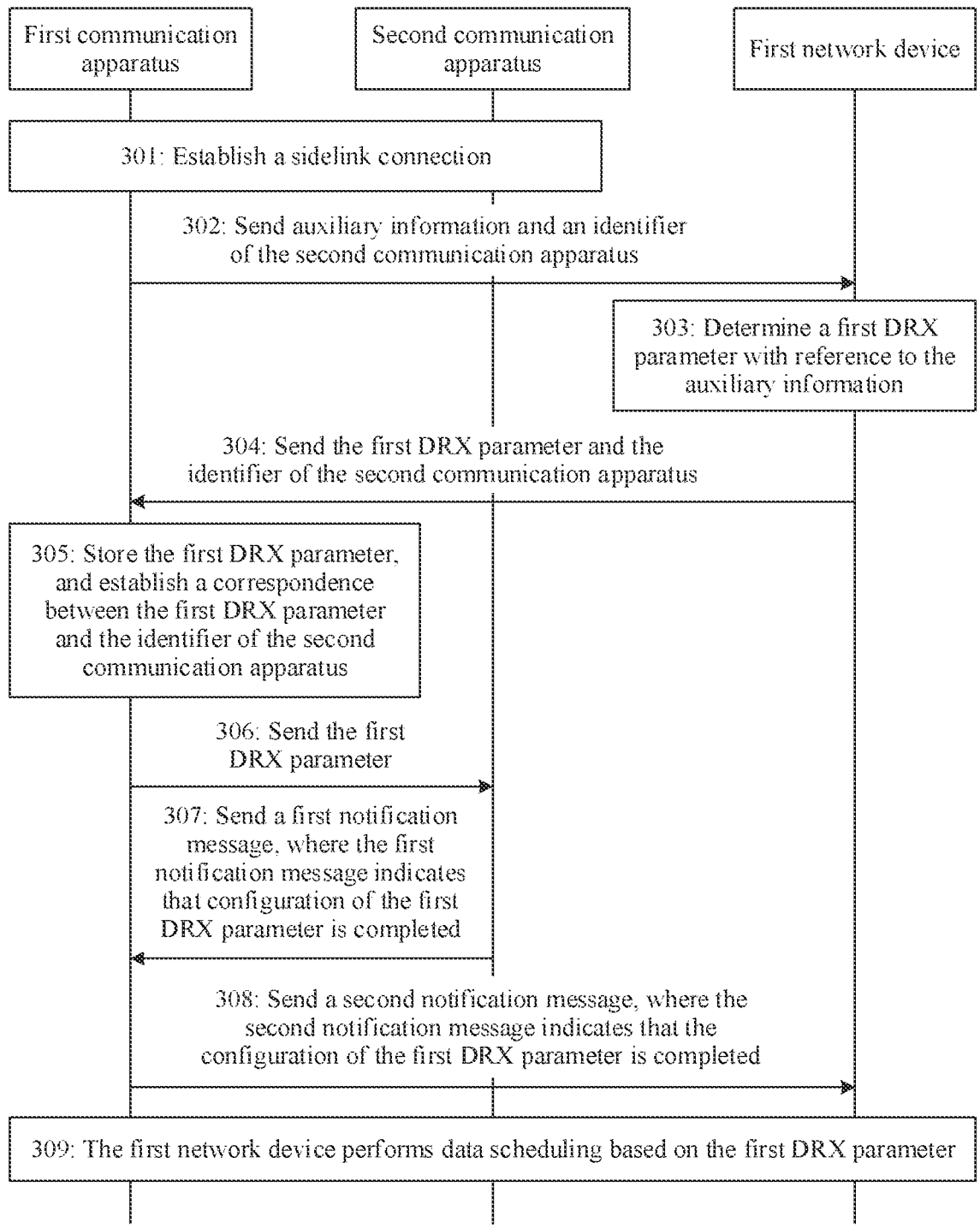
FIG. 3 is a schematic flowchart of a DRX parameter configuration method according to an embodiment of this application.

Based on the principle according to this application, an embodiment of this application provides a DRX parameter configuration method. As shown in FIG. 3, the method includes the following steps.

301: A first communication apparatus establishes a sidelink connection to a second communication apparatus.

In this embodiment of this application, descriptions are provided by using an example in which the first communication apparatus serving as a data transmit end is first UE, the second communication apparatus serving as a data receive end is second UE, a first network device in a cell in which the first UE is located is a first base station, and a second network device in a cell in which the second UE is located is a second base station.

For example, when the first UE has a data communication requirement, the first UE sends a sidelink communication request to the first base station, and the first base station configures a resource allocation mode for the first UE based on the request. For example, when determining, based on a capability of the first UE, that the first UE does not support resource allocation, the first base station determines that the resource allocation mode is working mode 1; or when determining, based on a capability of the first UE, that the first UE supports resource allocation, the first base station determines that the resource allocation mode is working mode 2. The first base station allocates, to the first UE, a sidelink resource used to establish a connection to the second UE, and then the first UE sends, to the second UE by using the resource, a message for requesting to establish a PC5-S connection, to complete the sidelink connection between the first UE and the second UE.

For example, that the first UE has a data communication requirement may be that a mobile phone sends video data to a VR head-mounted display; or that the first UE has a data communication requirement may be that when a plurality of users play games on their respective mobile phones, a mobile phone of one user sends game data to mobile phones of a plurality of other users to keep a same game progress.

The PC5-S connection is an interface for connection between UEs in a D2D scenario.

302: The first communication apparatus sends auxiliary information and an identifier of the second communication apparatus to the first network device. The auxiliary information is used by the first network device to determine a first DRX parameter with reference to the auxiliary information.

In some implementations, the auxiliary information includes a data transmission requirement of the first communication apparatus on a sidelink.

Alternatively, the auxiliary information includes a second DRX parameter determined by the first communication apparatus based on a data transmission requirement of the first communication apparatus on a sidelink.

Alternatively, the auxiliary information includes a data transmission requirement of the first communication apparatus on a sidelink and a second DRX parameter determined by the first communication apparatus based on the data transmission requirement.

The data transmission requirement is a condition that needs to be met when the first communication apparatus sends data to the second communication apparatus, and the condition includes a latency requirement, a data transmission rate, a packet loss rate, and the like.

In some implementations, the data transmission requirement may be quality of service (quality of service, QoS) required by a service of the first communication apparatus on the sidelink.

The second DRX parameter may be understood as determined by the first communication apparatus based on the QoS required by the first communication apparatus on the sidelink.

For example, when the first UE knows that the first UE itself needs to send data to the second UE the second DRX parameter configured by the first UE for the second UE needs to meet: When the first UE needs to send data, the second UE is in an active time. In addition, if a service that the first UE needs to communicate with the second UE on the sidelink has a relatively high QoS requirement, the first UE may consider that the service has a relatively high latency requirement and low-latency data transmission needs to be performed. Therefore, a feature of the second DRX parameter that may be determined by the first UE based on this relatively high QoS requirement may be: Duration of a sleep period may be relatively short, and duration of an active time may be relatively long. In this way, when the first UE performs service communication with the second UE, the second UE can receive, in time, data sent by the first UE.

For example, if a service that the first UE needs to communicate with the second UE on the sidelink has a relatively high QoS requirement, for example, latency needs to reach 4 ms or 5 ms, and low-latency data transmission needs to be performed, the first UE may determine that in a DRX cycle corresponding to the second DRX parameter, a value of duration of a sleep period, namely, opportunity for DRX, is relatively small, and a value of duration of an active time, namely, drx-onDurationTimer, is relatively large. For example, duration of one DRX cycle is 10 ms, a value of the opportunity for DRX may be 4 ms, and a value of the drx-onDurationTimer is 6 ms. In this way, when the first UE needs to send data, the second UE may wake up in time to receive, in an active time, the data sent by the first UE, to meet a low latency requirement.

Alternatively, if a service that the first UE needs to communicate with the second UE on the sidelink has a relatively high QoS requirement, for example, a data packet loss rate needs to be less than 5%, the first UE may determine that in a DRX cycle corresponding to the second DRX parameter, a value of duration of a sleep period, namely, opportunity for DRX, is relatively small, and a value of duration of an active time, namely, drx-onDurationTimer, is relatively large. Similarly, for example, duration of one DRX cycle is 10 ms, a value of the opportunity for DRX may be 4 ms, and a value of the drx-onDurationTimer is 6 ms. In one DRX cycle, if duration in which the second UE is in an active time is longer than duration in which the second UE is in a sleep period, and it is considered that there may be latency when data is sent to the second UE, a probability that the second UE receives the data in an active time is increased, so that a data packet loss rate may be reduced.

The opportunity for DRX and the drx-onDurationTimer are specifically described in step 303. In some implementations, the identifier of the second communication apparatus may be a layer 2 ID, that is, the layer 2 ID is used as a unique identifier for identifying the second communication apparatus. Specifically, the layer 2 ID is an ID of a layer 2 of the second communication apparatus in a network communication architecture, and the layer 2 includes a media access control (media access control, MAC) layer, a radio link control protocol (radio link control, RLC) layer, a packet data convergence protocol (packet data convergence protocol, PDCP) layer, and a service data adaptation protocol (service data adaptation protocol, SDAP) layer. Each terminal device has a unique layer 2 ID, that is, the first network device may identify the second communication apparatus by using the layer 2 ID.

In some implementations, the identifier of the second communication apparatus may alternatively be a globally unique identifier (Globally Unique Identifier, GUID).

In some implementations, the first communication apparatus may send an RRC message to the first network device, and the RRC message includes the auxiliary information and the identifier of the second communication apparatus.

303: The first network device determines the first DRX parameter with reference to the auxiliary information.

After the first network device receives the auxiliary information and the identifier of the second communication apparatus that are sent by the first communication apparatus, the first network device may configure the first DRX parameter for the second communication apparatus with reference to the auxiliary information.

In some implementations, if the first network device receives the auxiliary information, and the data transmission requirement included in the auxiliary information is QoS, the first network device may determine the first DRX parameter for the second communication apparatus based on the QoS. For a determining manner, refer to the implementation in which the first UE determines the second DRX parameter in step 302.

If the auxiliary information received by the first network device is the second DRX parameter determined by the first communication apparatus, the first network device may determine, based on currently available resources, whether to use the second DRX parameter as the first DRX parameter. For example, if there are a relatively large quantity of currently available resources, that is, load of the first network device is relatively small, and a relatively large quantity of resources may be allocated to the first communication apparatus, duration in which the second communication apparatus is in an active time may be relatively short. If there are a relatively small quantity of currently available resources, that is, load of the first network device is relatively large, and a relatively small quantity of resources may be allocated to the first communication apparatus, for the second communication apparatus, a DRX parameter configuration requirement of the second communication apparatus is higher, for example, duration in which the second communication apparatus is in an active time is longer, so that a probability that the second communication apparatus receives data may be increased. Therefore, if the second DRX parameter indicates that the duration in which the second communication apparatus is in an active time conforms with the currently available resources, the first network device may use the second DRX parameter as the first DRX parameter. Otherwise, if the second DRX parameter indicates that the duration in which the second communication apparatus is in an active time does not conform with the currently available resources, the first network device may adaptively modify the second DRX parameter, so that a modified second DRX parameter conforms with current resource scheduling of the first network device.

For example, when current load of the first base station is relatively small, that is, there are a relatively large quantity of available time-frequency resources for the first UE, if duration corresponding to the available time-frequency resources is greater than duration of one DRX cycle, for example, one DRX cycle is 10 ms, when the first base station configures the first DRX parameter for the second UE, duration in which the second UE is in an active time may be relatively short, for example, 4 ms, and duration in which the second UE is in a sleep period may be relatively long, for example, 6 ms. This is because, in this case, all resources of the first base station can be used in this DRX cycle, and in the duration in which the second UE is in an active time, the first UE has a resource that can be selected to transmit data, which does not cause a case in which the first UE sends data while the second UE is in a sleep period. However, if the duration in which the second UE is in an active time is relatively long, it is very likely that the first UE does not continuously send data to the second UE. Therefore, the second UE does not need to be in an active time for a relatively long time. Therefore, when the first base station currently has a relatively large quantity of resources that can be allocated to the first UE, the duration in which the second UE is in an active time in the DRX cycle may be relatively short.

Therefore, that the second DRX parameter indicates that the duration in which the second communication apparatus is in an active time conforms with the currently available resources may be understood as that the first base station has a relatively large quantity of currently available resources, and in the second DRX parameter, the duration in which the second UE is in an active time is relatively short, and the duration in which the second UE is in a sleep period is relatively long, for example, the duration of the active time is 4 ms, and the duration of the sleep period is 6 ms. That the second DRX parameter indicates that the duration in which the second communication apparatus is in an active time does not conform with the currently available resources may be understood as that the first base station has a relatively large quantity of currently available resources, and in the second DRX parameter, the duration in which the second UE is in an active time is relatively long, and the duration in which the second UE is in a sleep period is relatively short, for example, the duration of the active time is 6 ms, and the duration of the sleep period is 4 ms. In this case, the first base station may modify the duration of the active time and the duration of the sleep period in the second DRX parameter. For example, after the modification, the duration of the active time is 4 ms, and the duration of the sleep period is 6 ms.

When current load of the first base station is relatively large, that is, there are a relatively small quantity of available time-frequency resources for the first UE, if duration corresponding to the available time-frequency resources is less than duration of one DRX cycle, for example, one DRX cycle is 10 ms, when the base station configures the first DRX parameter for the second UE, duration in which the second UE is in an active time may be relatively long, for example, 6 ms, and duration in which the second UE is in a sleep period may be relatively short, for example, 4 ms. This is because when there are a relatively small quantity of currently available resources, in one DRX cycle, duration that can be used by the second UE to receive data is relatively short. To avoid a case in which the first UE sends data but the second UE does not receive the data, the duration in which the second UE is in an active time needs to be longer, so that the second UE can receive the data on a relatively small quantity of resources. Therefore, when the first base station currently has a relatively small quantity of resources that can be allocated to the first UE, the duration in which the second UE is in an active time in the DRX cycle may be relatively long.

Therefore, that the second DRX parameter indicates that the duration in which the second communication apparatus is in an active time conforms with the currently available resources may be understood as that the first base station has a relatively small quantity of currently available resources, and in the second DRX parameter, the duration in which the second UE is in an active time is relatively long, and the duration in which the second UE is in a sleep period is relatively short, for example, the duration of the active time is 6 ms, and the duration of the sleep period is 4 ms. That the second DRX parameter indicates that the duration in which the second communication apparatus is in an active time does not conform with the currently available resources may be understood as that the first base station has a relatively small quantity of currently available resources, and in the second DRX parameter, the duration in which the second UE is in an active time is relatively short, and the duration in which the second UE is in a sleep period is relatively long, for example, the duration of the active time is 4 ms, and the duration of the sleep period is 6 ms. In this case, the first base station may modify the duration of the active time and the duration of the sleep period in the second DRX parameter. For example, after the modification, the duration of the active time is 6 ms, and the duration of the sleep period is 4 ms.

If the auxiliary information received by the first network device includes QoS and the second DRX parameter, the first network device may modify the second DRX parameter based on the QoS, to obtain the first DRX parameter. Specifically, a feature of the first DRX parameter obtained by modifying the second DRX parameter based on the QoS may be similar to an implementation in which the first UE determines the second DRX parameter in step 302.

For example, if a service that the first UE needs to communicate with the second UE on the sidelink has a relatively high QoS requirement, the first base station may consider that the service has a relatively high latency requirement, and low-latency data transmission needs to be performed. Therefore, if a feature of the second DRX parameter is: Duration of a sleep period may be relatively long, and duration of an active time may be relatively short. For example, duration of one DRX cycle is 10 ms, a value of opportunity for DRX is 6 ms, and a value of drx-onDurationTimer is 4 ms. Based on this, the first base station may modify the second DRX parameter to obtain the first DRX parameter. A feature of the obtained first DRX parameter may be as follows: Duration of a sleep period may be relatively short, and duration of an active time may be relatively long. For example, in the first DRX parameter, a value of opportunity for DRX is 4 ms, and a value of drx-onDurationTimer is 6 ms. In this way, when the first UE performs service communication with the second UE, the second UE can receive, in time, data sent by the first UE. For a specific reason, refer to the description in step 302.

In some implementations, for example, the first communication apparatus (the first UE) is Tx UE, and the second communication apparatus (the second UE) is Rx UE. Specific parameters and functions included in the first DRX parameter may be as follows:

drx-onDurationTimer indicates duration of an active time in a DRX cycle.

opportunity for DRX indicates duration of a sleep period in the DRX cycle.

drx-SlotOffset indicates latency before the drx-onDurationTimer is started.

drx-InactivityTimer indicates duration in which the Rx UE is continuously in an active time after the Rx UE successfully decodes a PSCCH that schedules new data for initial transmission, namely, this parameter is valid for initially transmitted data. When UE receives PSCCH scheduling information during on-duration, the UE starts the drx-InactivityTimer. When the UE receives another PSCCH scheduling information during the running of the drx-InactivityTimer, the UE continuously restarts the drx-InactivityTimer.

drx-RetransmissionTimerTtoR indicates duration in which the Rx UE needs to wait before the Rx UE receives retransmitted data sent by the Tx UE. A start condition of this parameter is that drx-HARQ-RTT-TimerTtoR expires and there is data that is not successfully received.

drx-RetransmissionTimerRtoT indicates duration in which the Tx UE needs to wait before the Tx UE receives acknowledgment (Acknowledgment, ACK) message/negative-acknowledgement (Negative-Acknowledgment, NACK) message feedback data sent by the Rx UE. A start condition of this parameter is that drx-HARQ-RTT-TimerRtoT expires, and there is data that is not successfully received. drx-LongCycleStartOffset indicates both Long DRX Cycle and drx-StartOffset, where the Long DRX Cycle indicates a long DRX cycle, and the drx-StartOffset specifies a start subframe of the long DRX cycle and a start subframe of a short DRX cycle.

drx-ShortCycle indicates Short DRX Cycle, namely, a short DRX cycle.

drx-ShortCycleTimer indicates duration of a Short DRX cycle followed by the Rx UE.

drx-HARQ-RTT-TimerTtoR indicates duration before a MAC entity of the Rx UE expects to receive sidelink resources allocated for HARQ retransmission from the Tx UE. To be specific, after duration of a time window of this parameter from previous transmission, the Rx UE starts to listen to the retransmitted data (which is equivalent to a limitation on the retransmitted data, to prevent the Tx UE from continuously sending the retransmitted data irregularly). After the drx-HARQ-RTT-Timer expires, the Tx UE may start retransmission. In this case, the drx-RetransmissionTimerTtoR is started, and the Rx UE receives data during the running of the drx-RetransmissionTimerTtoR.

drx-HARQ-RTT-TimerRtoT indicates duration before a MAC entity of the Tx UE expects to receive feedback data sent by the Rx UE. To be specific, after duration of a time window of this parameter from previous ACK/NACK feedback transmission, the Rx UE starts to send ACK/NACK feedback data (which is equivalent to a limitation on an ACK/NACK feedback, to prevent the Rx UE from continuously sending feedback data). After the drx-HARQ-RTT-TimerRtoT expires, the Rx UE may start feedback. In this case, the drx-RetransmissionTimerRtoT is started, and the Rx UE sends feedback data during running of the drx-RetransmissionTimerRtoT.

In an example of the parameters included in the first DRX parameter, the first DRX parameter that may be determined based on the QoS may include at least one of the parameters included in the first DRX parameter.

304: The first network device sends the first DRX parameter and the identifier of the second communication apparatus to the first communication apparatus.

In some implementations, the first network device may send a first configuration message to the first communication apparatus. The first configuration message includes the first DRX parameter and the identifier of the second communication apparatus.

In some implementations, the first configuration message may be an RRC message.

305: The first communication apparatus stores the first DRX parameter, and establishes a correspondence between the first DRX parameter and the identifier of the second communication apparatus.

For example, the first UE may communicate with a plurality of UEs that receive data. Therefore, when receiving the first DRX parameter of the second UE, the first UE may establish a correspondence between the first DRX parameter and an identifier of the second UE, so that when data communication is performed between the first UE and the second UE, the first DRX parameter of the second UE may be determined based on the correspondence.

306: The first communication apparatus sends the first DRX parameter to the second communication apparatus.

In some implementations, the first communication apparatus may send a second configuration message to the second communication apparatus, and the second configuration message may include the first DRX parameter.

In some implementations, the second configuration message may be an RRC message.

For example, the first UE may send the RRC message to the second UE on a sidelink established between the first UE and the second UE.

307: The second communication apparatus sends a first notification message to the first communication apparatus. The first notification message indicates that configuration of the first DRX parameter is completed.

In some implementations, the first notification message may be an RRC message.

308: The first communication apparatus sends a second notification message to the first network device. The second notification message indicates that the configuration of the first DRX parameter is completed.

In some implementations, the second notification message may be an RRC message.

309: The first network device performs data scheduling based on the first DRX parameter.

For example, in working mode 1, the first base station may perform data scheduling based on the first DRX parameter. Specifically, the first base station may store first DRX parameters corresponding to a plurality of second UEs. When the first UE sends data one second UE, the first UE may send a scheduling request to the first base station, and the first base station may determine, based on the scheduling request, the second UE that communicates with the first UE. How to specifically determine the second UE is described in subsequent step 602. In this way, the first base station may configure a resource for the first UE based on the first DRX parameter that corresponds to the second UE and that is stored by the first base station, so that the first UE sends data to the second UE on the configured resource.

Alternatively, step 309 may be replaced with the following: The first communication apparatus performs data scheduling based on the first DRX parameter.

That is, in working mode 2, the first communication apparatus performs data scheduling based on the first DRX parameter. In other words, the first communication apparatus selects a resource from a resource pool, and sends control information and the data information of the sidelink to the second communication apparatus.

Therefore, in this embodiment of this application, the first communication apparatus may send the auxiliary information to the first network device. The first network device determines, based on the auxiliary information, a DRX parameter corresponding to the second communication apparatus, and sends the DRX parameter to the first communication apparatus. The first communication apparatus may store the DRX parameter, and send the DRX parameter to the second communication apparatus, so that when determining that there is data to be received, the second communication apparatus may determine, based on the configured DRX parameter, duration in which the second communication apparatus is in an active time and duration in which the second communication apparatus is in a sleep period (an inactive time). In this way, if the second communication apparatus and the first communication apparatus are not within a coverage area of a same network device, in a D2D scenario, DRX parameters configured by the first network device and the first communication apparatus for the second communication apparatus are consistent, and the first communication apparatus may send data to the second communication apparatus based on the DRX parameter. In addition, the second communication apparatus serving as a data receive end may not need to be always in a data listening state, so that power consumption of the second communication apparatus can be reduced, and power of the second communication apparatus is saved.

Figure 4A:
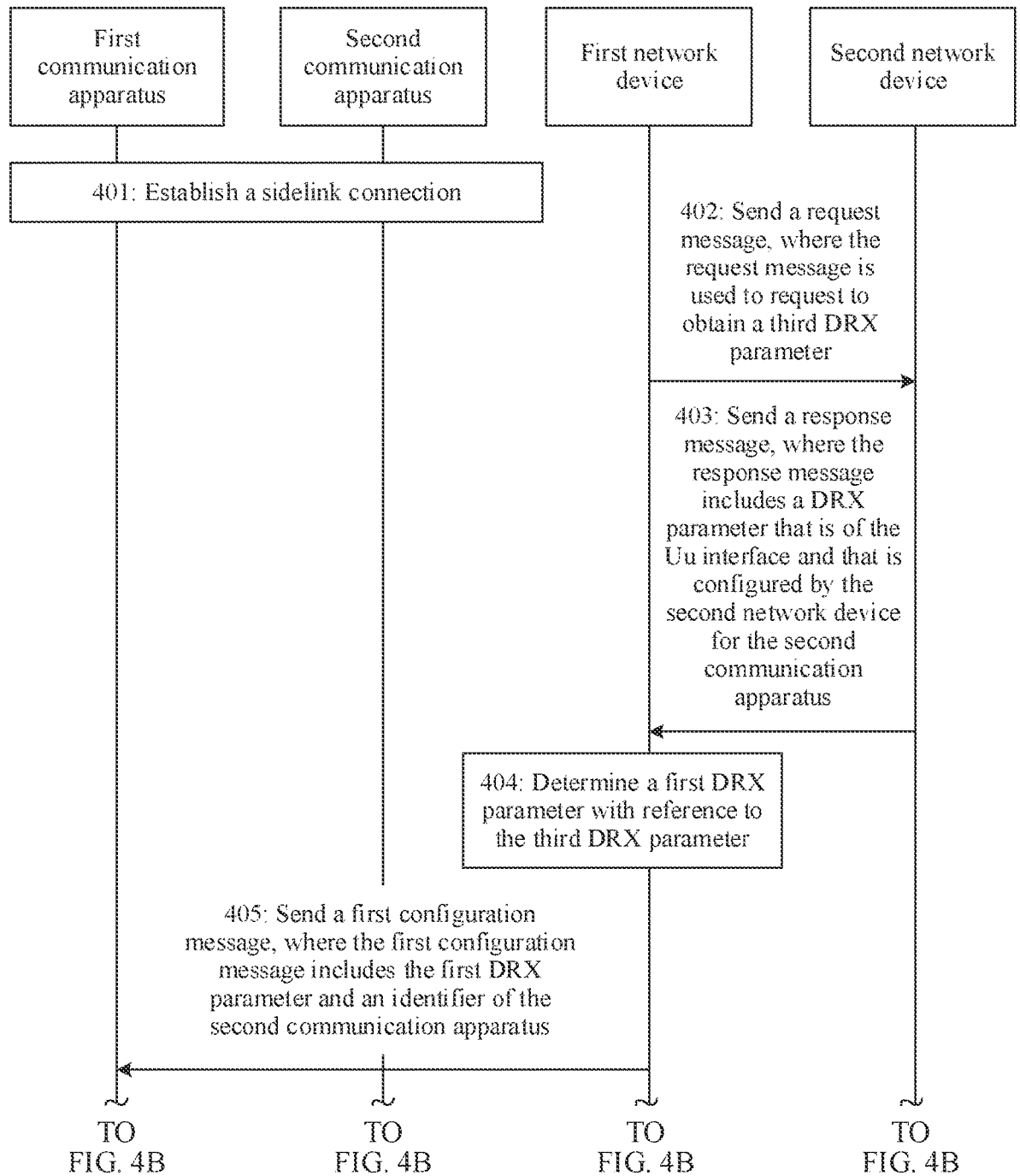
FIG. 4A and FIG. 4B are a schematic flowchart of a DRX parameter configuration method according to an embodiment of this application.
Figure 4B:
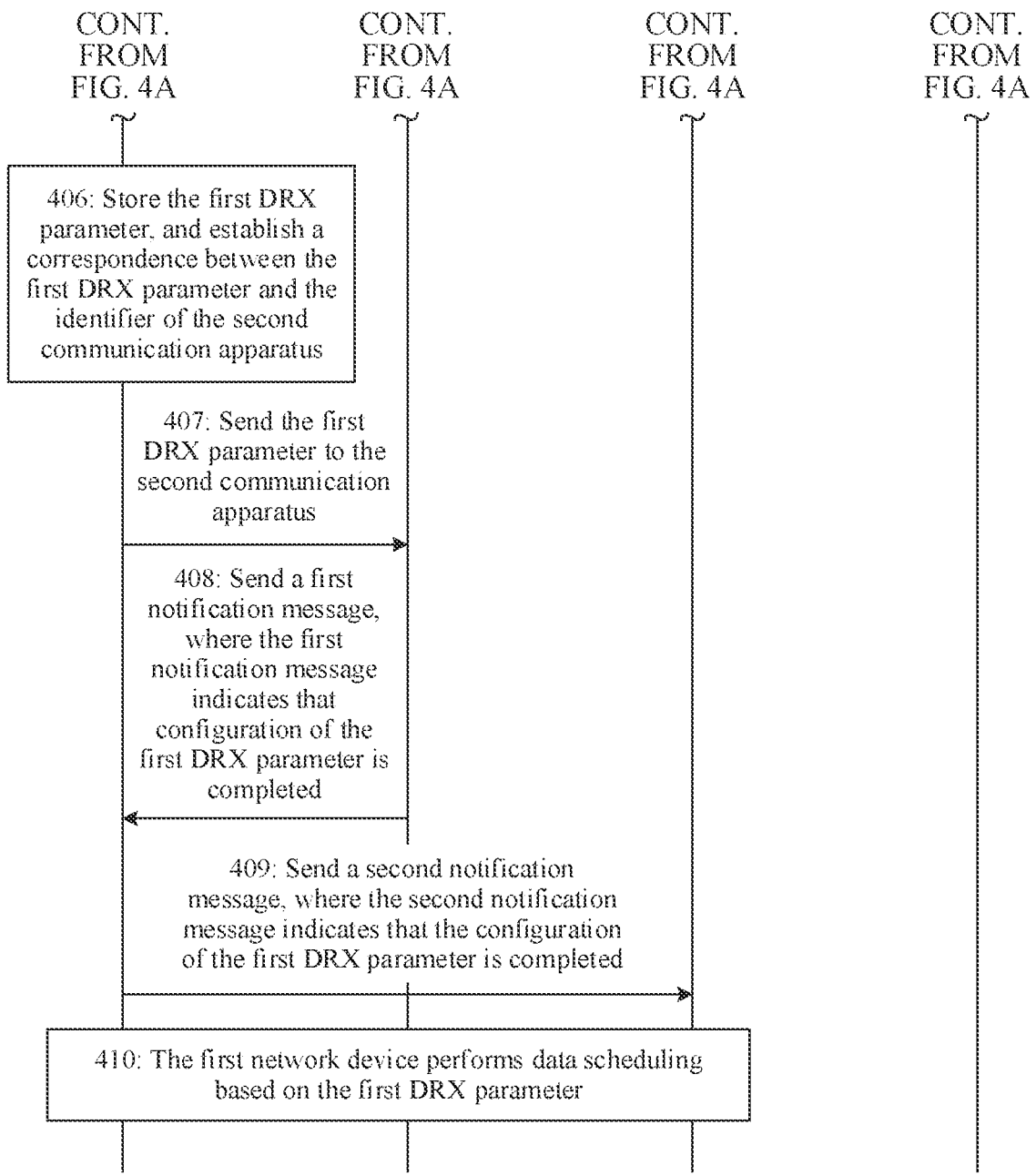

An embodiment of this application further provides a DRX parameter configuration method. As shown in FIG. 4A and FIG. 4B, the method includes the following steps.

401: A first communication apparatus establishes a sidelink connection to a second communication apparatus.

For an implementation of this step, refer to step 301.

402: When a first network device determines that the first communication apparatus establishes the sidelink connection to the second communication apparatus, the first network device sends a request message to a second network device. The request message is used to request to obtain a third DRX parameter, and the third DRX parameter is a DRX parameter that is of a Uu interface and that is configured by the second network device for the second communication apparatus.

The Uu interface is an interface for communication between a network device and a communication apparatus in 5G.

In some implementations, the first communication apparatus is within a coverage area of the first network device, and the second communication apparatus is within a coverage area of the second network device. For example, the Uu interface may be understood as an interface for communication between a base station and UE. When the UE establishes an RRC connection with the base station, the base station may configure, for different UEs, DRX parameters of Uu interfaces for communication between the base station and the UEs. In this embodiment, a DRX parameter configured by a second base station for second UE is denoted as a third DRX parameter.

403: The second network device sends a response message to the first network device. The response message includes the DRX parameter that is of the Uu interface and that is configured by the second network device for the second communication apparatus.

It should be noted that if the second communication apparatus is also within the coverage area of the first network device, the first network device knows the third DRX parameter of the Uu interface of the second communication apparatus, and step 402 and step 403 are not performed. The first network device may determine the first DRX parameter with reference to the third DRX parameter of the Uu interface between the first network device and the second communication apparatus. A specific implementation may be similar to an implementation of determining the first DRX parameter in step 404.

404: The first network device determines a first DRX parameter with reference to the third DRX parameter. The first DRX parameter is used by the first communication apparatus to send data to the second communication apparatus on a sidelink based on the first DRX parameter.

In some implementations, that the first network device determines a first DRX parameter with reference to the third DRX parameter may be understood as: When the first network device determines the first DRX parameter used for D2D communication (for example, communication by using a PC5 interface) between the first communication apparatus and the second communication apparatus, the first network device obtains the first DRX parameter with reference to the third DRX parameter. The third DRX parameter is a DRX parameter of a Uu interface between the second network device and the second communication apparatus. It may also be understood that when the first network device configures the first DRX parameter, the first DRX parameter may be aligned with the third DRX parameter of the second communication apparatus on the Uu interface.

In some implementations, parameter alignment may be that the first DRX parameter and the third DRX parameter are all or partially aligned.

In some implementations, parameter alignment may be understood as that a parameter, in the first DRX parameter, indicating that the second communication apparatus is in an active time is the same as or partially the same as a parameter, in the third DRX parameter, indicating that the second communication apparatus is in an active time.

A parameter in an active time may include:

drx-onDurationTimer, drx-InactivityTimer, drx-RetransmissionTimerTtoR, drx-RetransmissionTimerRtoT, ra-ContentionResolutionTimer, or the like that is running.

In some implementations, refer to FIG. 1. A DRX cycle includes an active time and a sleep period. When the first DRX parameter is configured with reference to the third DRX parameter, duration in which the second communication apparatus is in an active time on a PC5 interface may be the same as or partially the same as duration in which the second communication apparatus is in an active time on a Uu interface, and duration in which the second communication apparatus is in a sleep period on the PC5 interface may be the same as or partially the same as duration in which the second communication apparatus is in a sleep period on the Uu interface.

In some implementations, a status of the second communication apparatus is further affected by duration of each parameter, and each parameter may be the foregoing parameter in an active time. Therefore, parameter alignment may further include that duration of a plurality of parameters in a first DRX parameter of the second communication apparatus on a PC5 interface is consistent with duration of a plurality of parameters in a third DRX parameter of the second communication apparatus on a Uu interface.

405: The first network device sends a first configuration message to the first communication apparatus. The first configuration message includes the first DRX parameter and an identifier of the second communication apparatus.

In some implementations, the first configuration message may be an RRC message.

406: The first communication apparatus stores the first DRX parameter, and establishes a correspondence between the first DRX parameter and the identifier of the second communication apparatus.

For implementation of step 406 to step 410, refer to step 305 to step 309.

407: The first communication apparatus sends the first DRX parameter to the second communication apparatus.

408: The second communication apparatus sends a first notification message to the first communication apparatus. The first notification message indicates that configuration of the first DRX parameter is completed.

409: The first communication apparatus sends a second notification message to the first network device. The second notification message indicates that the configuration of the first DRX parameter is completed.

410: The first network device performs data scheduling based on the first DRX parameter.

Therefore, in this embodiment of this application, if the first communication apparatus and the second communication apparatus are not within a coverage area of a same network device, that is, the first communication apparatus is within the coverage area of the first network device, and the second communication apparatus is within the coverage area of the second network device, the first network device may request, from the second network device, the third DRX parameter that is of the Uu interface and that is configured by the second network device for the second communication apparatus, and the first network device configures a first DRX parameter of a PC5 interface for the second communication apparatus with reference to the third DRX parameter. Alternatively, if the first communication apparatus and the second communication apparatus are within a coverage area of a same network device, that is, both the first communication apparatus and the second communication apparatus are within the coverage area of the first network device, the first network device may configure a first DRX parameter of a PC5 interface for the second communication apparatus with reference to a third DRX parameter that is of the Uu interface and that is configured by the first network device for the second communication apparatus. In this way, duration in which the second communication apparatus is in an active time and duration in which the second communication apparatus is in a sleep period on the two interfaces may be the consistent as much as possible. In this way, when there is data to transmitted, the second communication apparatus saves power based on the third DRX parameter. In addition, because the third DRX parameter of the PC5 interface of the second communication apparatus is aligned with the first DRX parameter of the Uu interface of the second communication apparatus, power of the second communication apparatus can be further saved.

Figure 5:
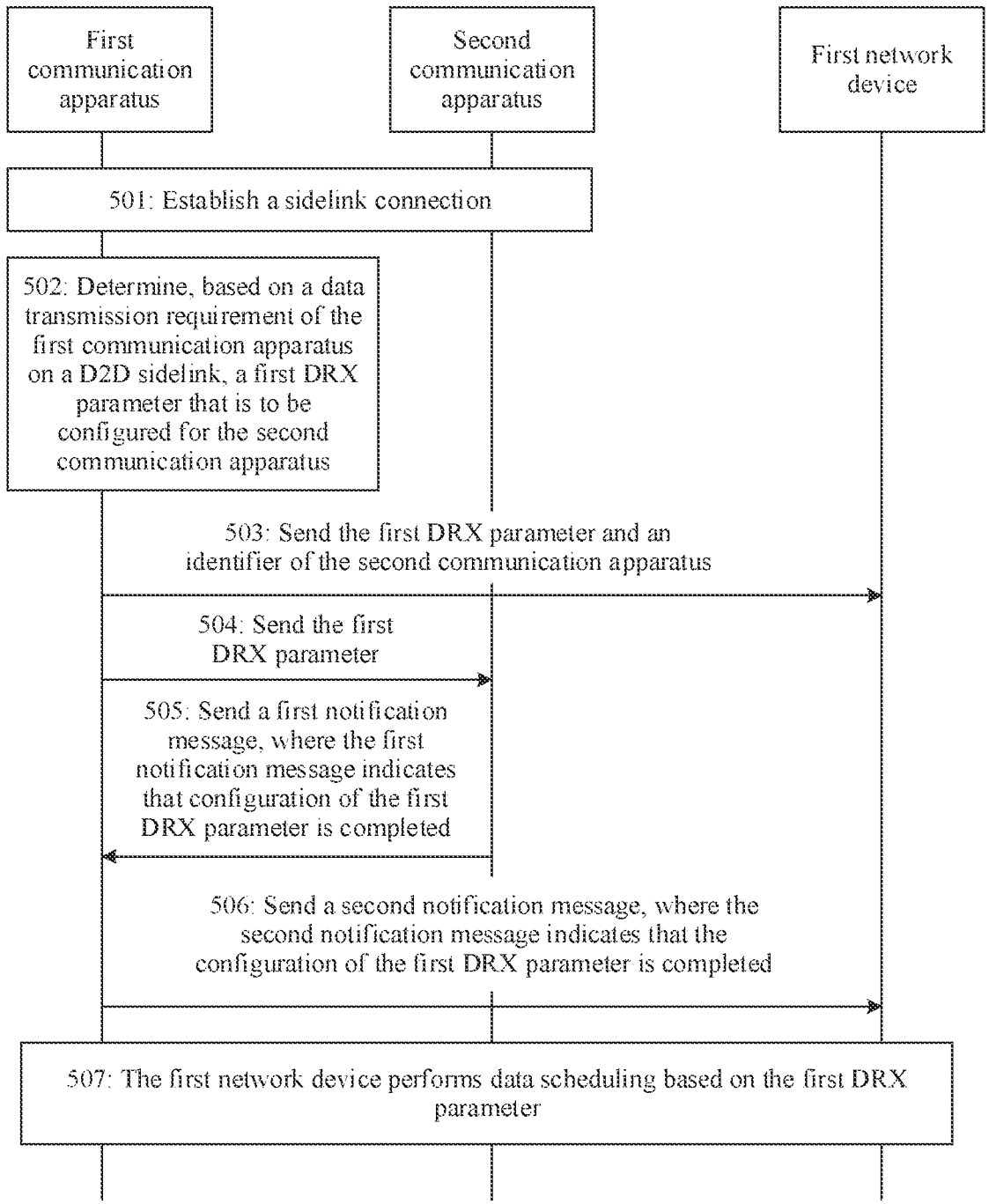
FIG. 5 is a schematic flowchart of a DRX parameter configuration method according to an embodiment of this application.

An embodiment of this application further provides a DRX parameter configuration method. As shown in FIG. 5, the method includes the following steps.

501: A first communication apparatus establishes a sidelink connection to a second communication apparatus.

502: The first communication apparatus determines, based on a data transmission requirement of the first communication apparatus on a D2D sidelink, a first DRX parameter that is to be configured for the second communication apparatus.

In some implementations, the data transmission requirement may be QoS required by a service of the first communication apparatus on a sidelink. In other words, the first DRX parameter may be understood as determined by the first communication apparatus based on the QoS required by the first communication apparatus on the sidelink.

For specific implementation of step 502, refer to implementation of determining the second DRX parameter by the first UE in step 302.

503: The first communication apparatus sends the first DRX parameter and an identifier of the second communication apparatus to a first network device.

In some embodiments, when a resource allocation mode of the sidelink is working mode 1, the first network device may schedule a resource for the first communication apparatus based on the first DRX parameter, so that the first communication apparatus communicates with the second communication apparatus on the allocated resource.

504: The first communication apparatus sends the first DRX parameter to the second communication apparatus.

The first communication apparatus may further establish a correspondence between the first DRX parameter and the identifier of the second communication apparatus.

For implementations of step 504 to step 507, refer to step 306 to step 309.

505: The second communication apparatus sends a first notification message to the first communication apparatus. The first notification message indicates that configuration of the first DRX parameter is completed.

506: The first communication apparatus sends a second notification message to the first network device. The second notification message indicates that the configuration of the first DRX parameter is completed.

507: The first network device performs data scheduling based on the first DRX parameter.

Therefore, in this embodiment of this application, the first communication apparatus may determine, based on a data transmission requirement of a service, the first DRX parameter to be configured for the second communication apparatus, so that the second communication apparatus can save power based on the first DRX parameter.

It should be noted that the embodiments corresponding to FIG. 3, FIG. 4A, FIG. 4B, and FIG. 5 in this application are all applicable to the two resource allocation modes of the sidelink communication: working mode 1 and working mode 2.

After the first DRX parameter is configured for the second communication apparatus, if the first communication apparatus has a data transmission requirement, how to allocate a transmission resource for data transmission between the first communication apparatus and the second communication apparatus is described in the following embodiment.

Figure 6:
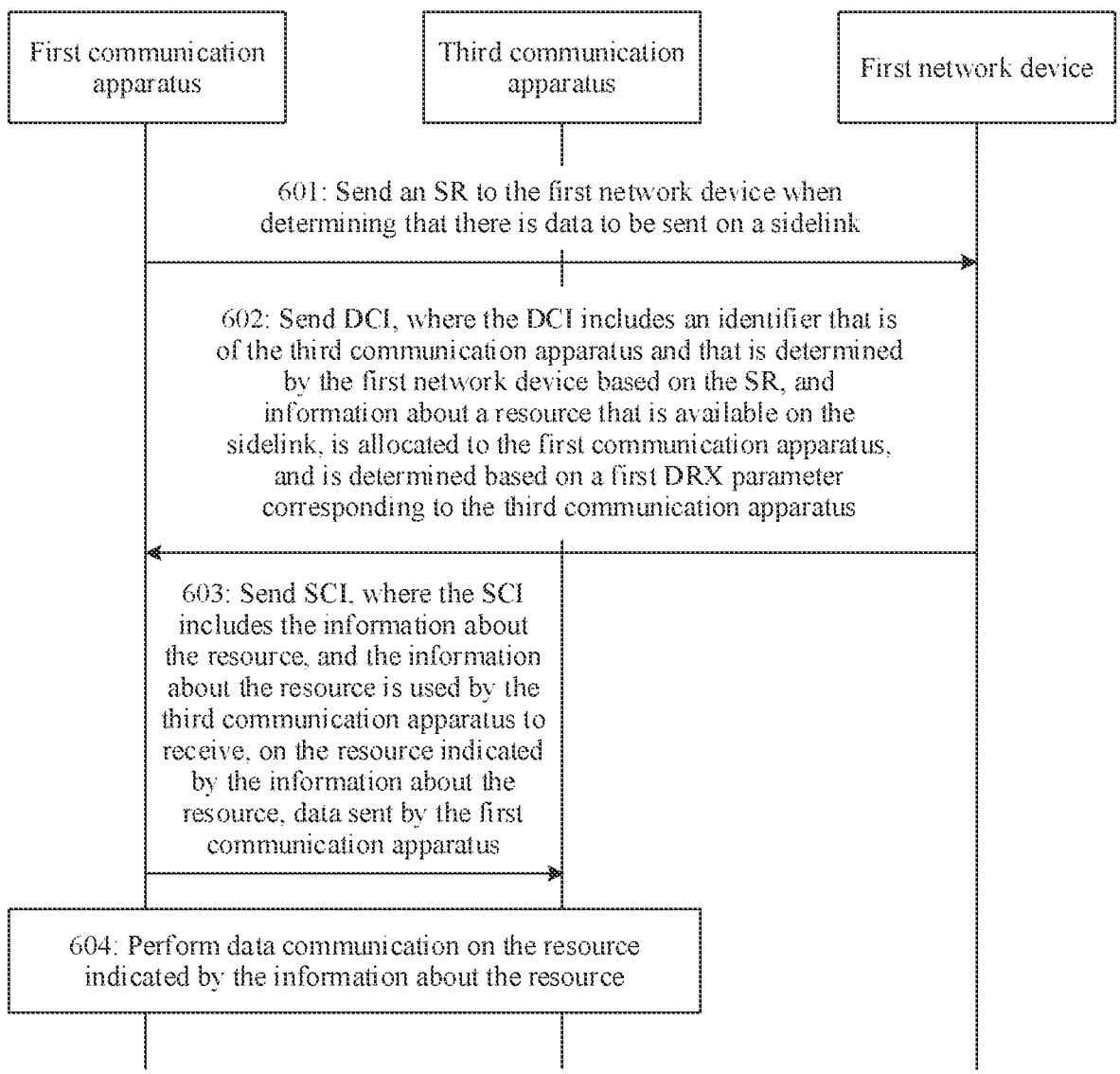
FIG. 6 is a schematic flowchart of a transmission resource allocation method for data transmission according to an embodiment of this application.

For working mode 1, that is, when the transmission resource is allocated by a network device such as a base station, refer to FIG. 6. Specific implementation of step 309, step 410, or step 507 may include the following steps.

601: When the first communication apparatus determines that there is data to be sent on a sidelink, the first communication apparatus sends an SR to the first network device.

The SR is used to indicate a communication requirement of the first communication apparatus on the sidelink.

For example, first UE may simultaneously perform D2D communication with a plurality of second UEs that can receive data. Therefore, when the first UE needs to send data on a sidelink, the first UE sends an SR to a first base station. The SR is used to indicate, to the first base station, that the first UE needs to send data in this case, and is used to request, from the first base station, a resource for performing D2D communication by the first UE on the sidelink. When the first UE establishes sidelinks to the plurality of second UEs, the first UE may send one SR to the first base station for each second UE, that is, the first UE may send a plurality of SRs to the first base station.

For example, that the first UE needs to send data on the sidelink may be that a mobile phone sends video data to a VR head-mounted display, but the mobile phone does not obtain a resource for sending the video data.

602: The first network device sends downlink control information (downlink control information, DCI) to the first communication apparatus. The DCI includes an identifier that is of a third communication apparatus and that is determined by the first network device based on the SR, and information about a resource that is available on the sidelink, is allocated to the first communication apparatus, and is determined based on a first DRX parameter corresponding to the third communication apparatus.

In some implementations, because the first communication apparatus may simultaneously establish sidelinks to a plurality of second communication apparatuses, the first network device may determine, based on a plurality of SRs sent by the first communication apparatus, a second communication apparatus corresponding to each SR. In other words, the first network device may determine, based on a received SR, a third communication apparatus in the plurality of second communication apparatuses connected to the first communication apparatus, and determine, based on a first DRX parameter corresponding to the third communication apparatus, information about a resource allocated to the first communication apparatus and the third communication apparatus. In this way, when the third communication apparatus is in an active time, the first communication apparatus can send data on a time domain resource indicated by the information about the resource, and the third communication apparatus receives the data on the resource indicated by the information about the resource.

For example, a base station allocates, to each UE within a coverage area, a resource that can be used to send an SR. Therefore, when first UE sends an SR to a first base station, and when the first base station receives the SR on a current resource, the first base station may determine the first UE corresponding to the SR, where the SR reported by the first UE is bound to a logical channel on a sidelink. Therefore, the first base station may determine, based on the received SR in a plurality of sidelinks connected to the first UE, a sidelink corresponds to the SR, and a data receive end of the determined sidelink is third UE. In other words, the first base station may determine, based on the received SR, that the SR corresponds to the third UE in a plurality of second UEs connected to the first UE. The SR may be 1-bit information.

The third communication apparatus may be one of the second communication apparatuses when the first DRX parameter is configured in the embodiments shown in FIG. 3 to FIG. 5.

When determining, based on the first DRX parameter corresponding to the third communication apparatus, the information about the resource that is available on the sidelink and that is allocated to the first communication apparatus, the first network device may determine, in a resource pool based on duration (including the duration and a start time point of the duration) corresponding to a parameter of an active time in the first DRX parameter, a time-frequency resource that is the same as duration corresponding to the parameter of the active time. The duration of an active time may be longer than duration of an allocated time domain resource.

If the first network device does not notify the first communication apparatus of a second communication apparatus with which a resource is used to communicate when the first network device configures, for the first communication apparatus, the resource for communication on the sidelink, the first communication apparatus may select a second communication apparatus with a highest data transmission priority, but the second communication apparatus may be in a sleep period. In this case, data sent by the first communication apparatus is not received by the selected second communication apparatus.

In some implementations, the first network device may send the DCI to the first communication apparatus on a PDCCH.

In some implementations, the information about the resource may include location information of a PSSCH available to the third communication apparatus.

603: The first communication apparatus sends sidelink control information (sidelink control information, SCI) to the third communication apparatus. The SCI includes the information about the resource, and the information about the resource is used by the third communication apparatus to receive, on the resource indicated by the information about the resource, data sent by the first communication apparatus.

When the first communication apparatus receives, from the first network device, the identifier of the third communication apparatus and the information about the resource that is allocated, the first communication apparatus may send the information about the resource to the third communication apparatus based on the identifier of the third communication apparatus, so that the third communication apparatus can receive, based on the resource indicated by the information about the resource, data sent by the first communication apparatus.

In some implementations, the first communication apparatus may send the SCI on a PSCCH, and the information about the resource included in the SCI is a location of a PSSCH on which the third communication apparatus needs to receive data.

604: The first communication apparatus performs data communication with the third communication apparatus on the resource indicated by the information about the resource.

To be specific, the first communication apparatus sends data to the third communication apparatus on the resource, and the third communication apparatus receives, on the resource, the data sent by the first communication apparatus.

In some implementations, that the PSCCH is received from the third communication apparatus may also be understood as that when scheduling information indicating initial transmission of new data is received from the third communication apparatus, the third communication apparatus may start drx-InactivityTimer based on the first DRX parameter corresponding to the third communication apparatus.

In some implementations, specific data scheduling processes of the first communication apparatus and the third communication apparatus may further include the following cases. For example, the first communication apparatus is Tx UE, and the third communication apparatus is Rx UE.

When receiving a protocol data unit (protocol data unit, MAC PDU) sent by the Tx UE, the Rx UE starts drx-HARQ-RTT-TimerTtoR (data retransmission cannot be performed in this period) for a corresponding HARQ process, stops drx-RetransmissionTimerTtoR (duration in which the Rx UE needs to wait for receiving retransmitted data) of the corresponding HARQ process, and enters a sleep period.

When the Rx UE sends ACK/NACK to the Tx UE (when the Rx UE receives data sent by the Tx UE, the Rx UE sends ACK to the Tx UE; or when the Rx UE does not receive data sent by the Tx UE, the Rx UE sends NACK to the Tx UE), drx-HARQ-RTT-TimerRtoT is started (an ACK/NAKC feedback cannot be performed in this period), drx-RetransmissionTimerRtoT (duration in which the Rx UE needs to wait for sending the ACK/NAKC feedback) is stopped, and the Rx UE enters a sleep time.

When the drx-HARQ-RTT-TimerTtoR expires, if data of the corresponding HARQ process is not successfully received, the drx-RetransmissionTimerTtoR is started for the corresponding HARQ process, and the Rx UE enters an active time.

When the drx-HARQ-RTT-TimerRtoT expires, if the ACK/NAKC feedback sent by the Rx UE is not successfully received, the drx-RetransmissionTimerRtoT is started, and the Rx UE enters an active time.

When the Rx UE receives DRX Command MAC CE (control element, control element) or Long DRX Command MAC CE, drx-onDurationTimer and drx-InactivityTimer are stopped.

When the drx-InactivityTimer expires or the Rx UE receives the DRX Command MAC CE, if Short DRX Cycle is configured currently, drx-ShortCycleTimer is started or restarted, and Short DRX Cycle is used; otherwise, Long DRX Cycle is used.

When the drx-ShortCycleTimer expires, the Long DRX Cycle is used.

When the Rx UE receives the Long DRX Command MAC CE, the drx-ShortCycleTimer is stopped, and the Long DRX Cycle is used.

When the Short DRX Cycle is used and [(SFN×10)+subframe number] modulo (drx-ShortCycle)=(drx-StartOffset) modulo (drx-ShortCycle), or when the Long DRX Cycle is used and [(SFN×10)+subframe number] modulo (drx-LongCycle)=drx-StartOffset (the SFN is a system frame number, indicating a system frame number), the drx-onDurationTimer is started after the drx-SlotOffset at the beginning of a subframe.

When a MAC entity is in an active time, the Rx UE needs to listen to a PSCCH.

When the Rx UE receives a PSCCH indicating new data transmission, the drx-InactivityTimer is started.

When the Rx UE receives a PSCCH indicating data retransmission, the drx-HARQ-RTT-TimerTtoR is started, and the drx-RetransmissionTimerTtoR is stopped.

When the Rx UE receives a PSCCH indicating transmission of an ACK/NACK feedback, the drx-HARM-RTT-TimerRtoT is started, and the drx-RetransmissionTimerRtoT is stopped.

Therefore, based on the descriptions of the method steps corresponding to FIG. 6, the third communication apparatus is a data receive end that is in an active time and that is determined by the first network device based on the first DRX parameter. Therefore, when the first communication apparatus sends the data on the resource allocated by the first network device, the third communication apparatus is in an active time, and the third communication apparatus may receive the data on the resource allocated by the first network device. Therefore, the third communication apparatus does not need to be always in a state of monitoring whether there is data to be received, to save power of the third communication apparatus.

Figure 7:
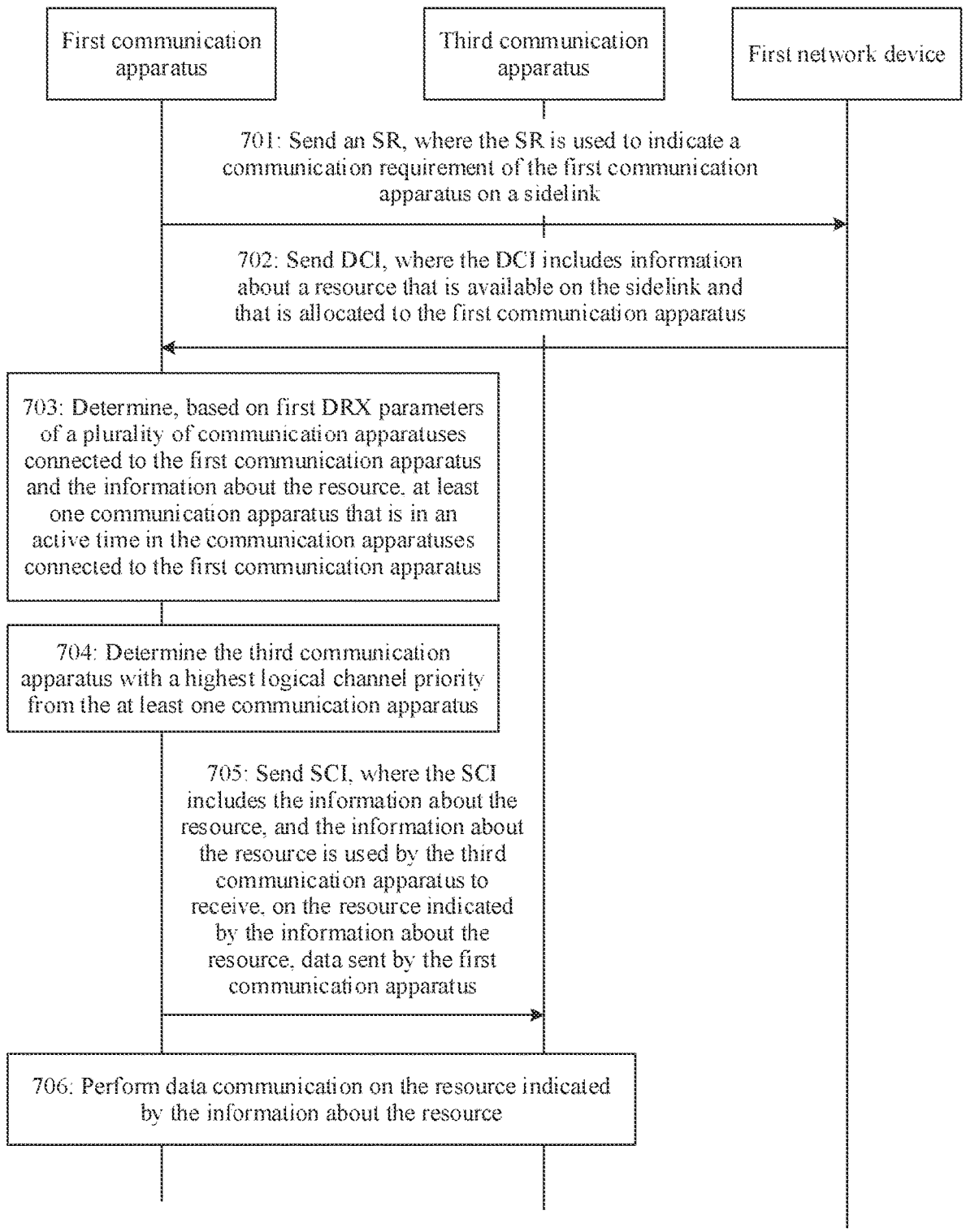
FIG. 7 is a schematic flowchart of a transmission resource allocation method for data transmission according to an embodiment of this application.

For working mode 1, that is, when the transmission resource is allocated by a network device such as a base station, refer to FIG. 7, Specific implementation of step 309, step 410, or step 507 may include the following steps.

701: When the first communication apparatus determines that there is data to be sent on a sidelink, the first communication apparatus sends an SR to the first network device. The SR is used to indicate a communication requirement of the first communication apparatus on the sidelink.

For implementation of step 701, refer to step 601.

702: The first network device sends DCI to the first communication apparatus. The DCI includes information about a resource that is available on the sidelink and that is allocated to the first communication apparatus.

703: The first communication apparatus determines, based on first DRX parameters of a plurality of communication apparatuses connected to the first communication apparatus and the information about the resource, at least one communication apparatus that is in an active time in the communication apparatuses connected to the first communication apparatus.

Because the first communication apparatus stores first DRX parameters corresponding to a plurality of second communication apparatuses, and the first communication apparatus also knows a PSSCH location in specific information about a resource in a PDCCH, the first communication apparatus may determine, based on the information about the resource (location information of a PSSCH) allocated by the first communication apparatus and the first DRX parameters of the plurality of communication apparatuses connected to the first communication apparatus, at least one communication apparatus that is currently is an active time.

704: The first communication apparatus determines a third communication apparatus with a highest logical channel priority from the at least one communication apparatus.

In some implementations, there may be a plurality of communication apparatuses that establish sidelinks to the first communication apparatus, and each sidelink may correspond to a plurality of logical channels. Service data sent on different logical Channels may be different. A higher service priority indicates a higher priority of a corresponding logical channel. In this way, the logical channel with the highest priority may be determined based on the service priority, to determine a third communication apparatus that communicates with the first communication apparatus on the sidelink corresponding to the logical channel.

In some implementations, the first communication apparatus may further determine, from the at least one communication apparatus, a communication apparatus whose logical channel priority is second or third as the third communication apparatus.

705: The first communication apparatus sends SCI to the third communication apparatus. The SCI includes the information about the resource, and the information about the resource is used by the third communication apparatus to receive, on the resource indicated by the information about the resource, data sent by the first communication apparatus.

For implementation of step 705, refer to step 603.

706: The first communication apparatus performs data communication with the third communication apparatus on the resource indicated by the information about the resource.

For implementation of step 706, refer to step 604.

Therefore, based on the descriptions of the method steps corresponding to FIG. 7, when the first communication apparatus receives the information about the resource allocated by the first network device, the first communication apparatus may determine, based on the first DRX parameter and the information about the resource, the third communication apparatus that is in an active time and that has the highest logical channel priority, so that when the first communication apparatus sends data on the resource indicated by the information about the resource, the third communication apparatus is in an active time, and the third communication apparatus can receive the data on the resource. This can ensure that data on a logical channel with a highest priority is received in time, and the third communication apparatus does not need to be always in a state of monitoring whether there is data to be received, to save power of the third communication apparatus.

Figure 8:
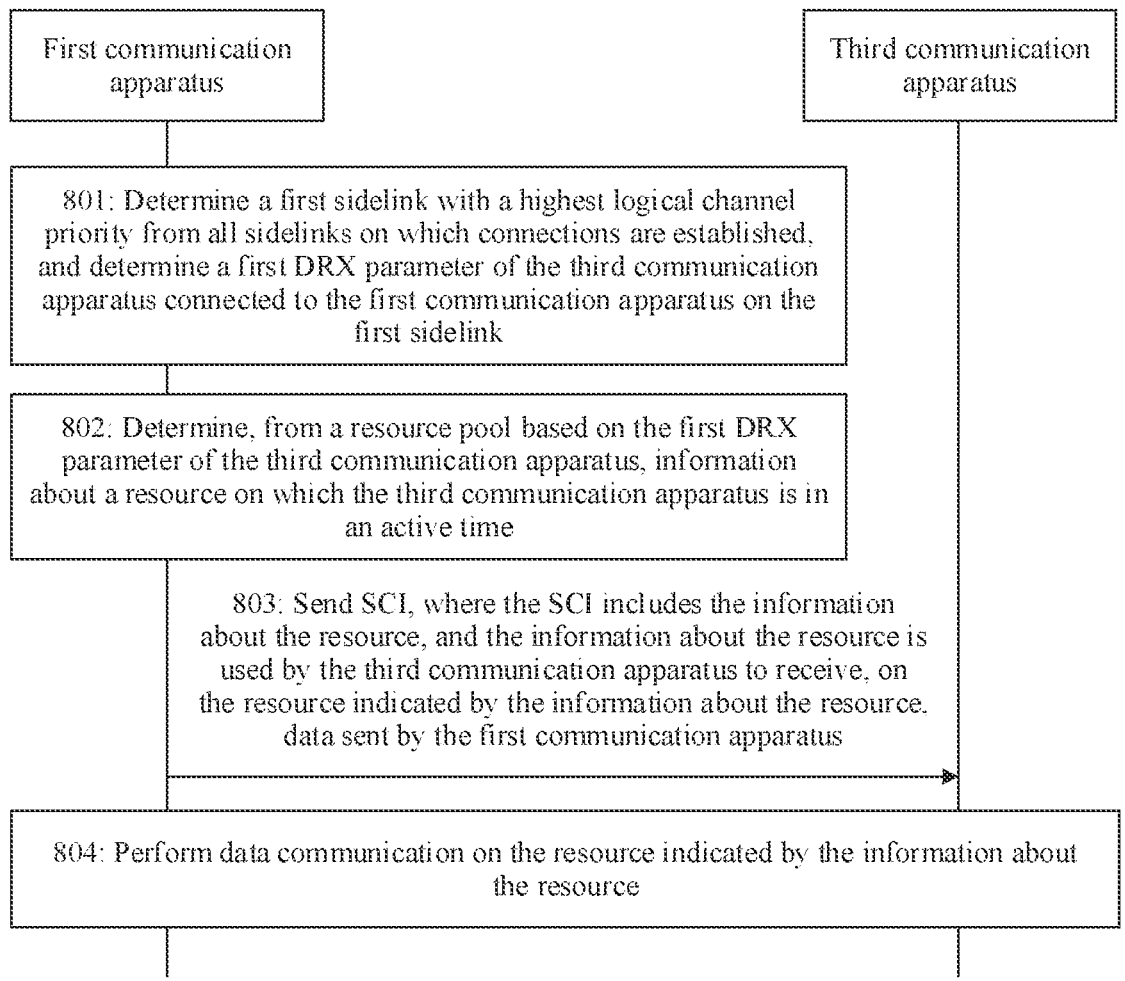
FIG. 8 is a schematic flowchart of a transmission resource allocation method for data transmission according to an embodiment of this application.

For working mode 2, that is, when the transmission resource is selected by a terminal device from a resource pool, refer to FIG. 8. Specific implementation of step 309, step 410, or step 507 may alternatively include the following steps.

801: The first communication apparatus determines a first sidelink with a highest logical channel priority from all sidelinks on which connections are established, and determines a first DRX parameter of a third communication apparatus connected to the first communication apparatus on the sidelink.

In some implementations, there may be a plurality of communication apparatuses that establish sidelinks to the first communication apparatus, and there may be a plurality of logical channels on each sidelink. Service data sent on different logical channels may be different. A higher service priority indicates a higher priority of a corresponding logical channel. In this way, the logical channel with the highest priority may be determined based on the service priority, to determine a sidelink on which the logical channel with the highest priority is located. The sidelink is the first sidelink, and a data receive end corresponding to the first sidelink is the third communication apparatus. Then, the first communication apparatus may determine a first DRX parameter of the third communication apparatus based on a stored correspondence between an identifier of the communication apparatus serving as a data receive end and the first DRX parameter.

802: The first communication apparatus determines, from a resource pool based on the first DRX parameter of the third communication apparatus, information about a resource on which the third communication apparatus is in an active time.

For example, a first DRX parameter of the third UE includes a parameter in an active time and a parameter in a sleep state (including duration and a start time point of a parameter). For example, the parameter in the active time includes drx-onDurationTimer, drx-InactivityTimer, drx-RetransmissionTimerTtoR, or drx-RetransmissionTimerRtoT. The first UE may determine, from a resource pool and based on duration corresponding to the parameter in the active time, a time-frequency resource corresponding to a time domain resource in duration of the parameter in the active time, and the time-frequency resource serves as information about a resource on which the third UE is in an active time.

803: The first communication apparatus sends SCI to the third communication apparatus. The SCI includes the information about the resource, and the information about the resource is used by the third communication apparatus to receive, on the resource indicated by the information about the resource, data sent by the first communication apparatus.

For implementation of step 803, refer to step 603.

804: The first communication apparatus performs data communication with the third communication apparatus on the resource indicated by the information about the resource.

For implementation of step 804, refer to step 604.

Therefore, based on the descriptions of the method steps corresponding to FIG. 8, when the first communication apparatus determines the first sidelink corresponding to a logical channel with a highest priority, the first communication apparatus may determine, from the resource pool based on the first DRX that corresponds to the third communication apparatus serving as a data receive end on the first sidelink, the resource on which the third communication apparatus is in an active time. That is, the first communication apparatus may determine an active time and a sleep period of the third communication apparatus based on the first DRX parameter, to send the data to the third communication apparatus on the resource on which the third communication apparatus is in an active time. The third communication apparatus may receive, on the resource, the data sent by the first communication apparatus, and the third communication apparatus does not need to be always in a state of monitoring whether there is data to be received, to save power of the third communication apparatus.

With reference to FIG. 3, FIG. 4A, FIG. 4B, FIG. 5, FIG. 6, FIG. 7, and FIG. 8, the foregoing describes a communication method according to embodiments of this application in detail. With reference to FIG. 9 to FIG. 13, the following describes a communication apparatus according to embodiments of this application in detail, for example, a terminal device, an apparatus (for example, a processor, a circuit, or a chip) used in a terminal device, a network device, or an apparatus (for example, a processor, a circuit, or a chip) used in a network device.

Figure 9:
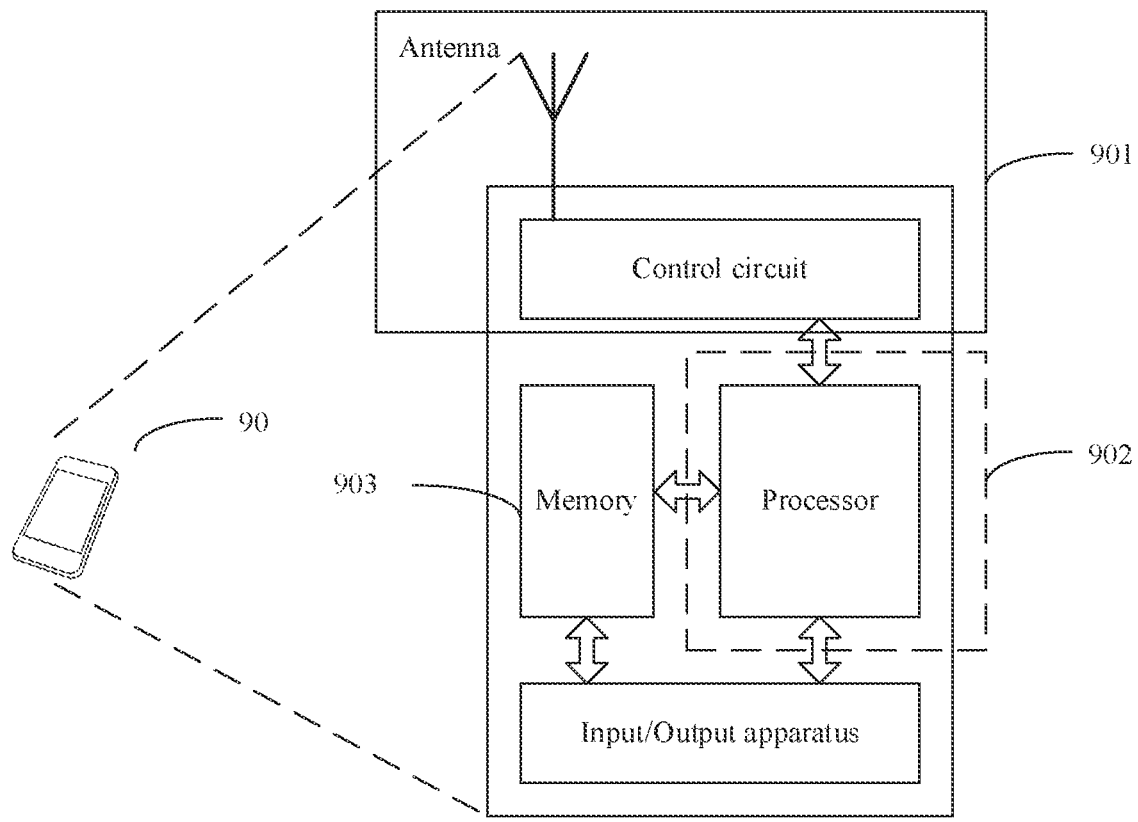
FIG. 9 is a schematic diagram of a structure of a terminal device according to an embodiment of this application.

FIG. 9 is a schematic diagram of a structure of a terminal device according to an embodiment of this application. The terminal device is applicable to the system shown in FIG. 2, and perform functions of the terminal device in the foregoing method embodiments. For ease of description, FIG. 9 shows only main components of the terminal device. As shown in FIG. 9, the terminal device 90 includes a processor 902, a memory 903, (a control circuit and an antenna) 901, and an input/output apparatus. The processor 902 is mainly configured to process a communication protocol and communication data, control the entire terminal device, execute a software program, and process data of the software program, for example, is configured to support the terminal device in performing actions described in the foregoing method embodiments. The memory 903 is mainly configured to store the software program and the data. The control circuit is mainly configured to perform conversion between a baseband signal and a radio frequency signal, and process the radio frequency signal. A combination of the control circuit and the antenna may also be referred to as a transceiver, and may mainly be configured to send receive a radio frequency signal in an electromagnetic wave form. The input/output apparatus, for example, a touchscreen, a display, or a keyboard, is mainly configured to: receive data entered by a user and output data to the user.

After the terminal device is powered on, the processor 902 may read the software program in the memory, explain and execute instructions of the software program, and process the data of the software program. When data needs to be sent in a wireless manner, after the processor performs baseband processing on to-be-sent data, the processor outputs a baseband signal to a radio frequency circuit. After performing radio frequency processing on the baseband signal, the radio frequency circuit sends a radio frequency signal through an antenna in a form of an electromagnetic wave. When data is to be sent to the terminal device, the radio frequency circuit receives the radio frequency signal through the antenna, converts the radio frequency signal into a baseband signal, and outputs the baseband signal to the processor. The processor converts the baseband signal into data and processes the data.

A person skilled in the art may understand that for ease of description, FIG. 9 shows only one memory and only one processor. An actual terminal device may include a plurality of processors and a plurality of memories. The memory may also be referred to as a storage medium, a storage device, or the like. The memory may be a storage element located on a same chip as the processor, namely, an on-chip storage element, or an independent storage element. This is not limited in this embodiment of this application.

In an optional implementation, the terminal device may include a baseband processor and a central processing unit. The baseband processor is mainly configured to process the communication protocol and the communication data. The central processing unit is mainly configured to control the entire terminal device, execute the software program, and process the data of the software program. The processor in FIG. 9 may integrate functions of the baseband processor and the central processing unit. A person skilled in the art may understand that the baseband processor and the central processing unit may alternatively be processors independent of each other, and are interconnected by using a technology such as a bus. A person skilled in the art may understand that the terminal device may include a plurality of baseband processors to adapt to different network standards, the terminal device may include a plurality of central processing units to enhance a processing capability of the terminal device, and components of the terminal device may be connected by using various buses. The baseband processor may alternatively be expressed as a baseband processing circuit or a baseband processing chip. The central processing unit may alternatively be expressed as a central processing circuit or a central processing chip. A function of processing the communication protocol and the communication data may be built in the processor, or may be stored in the memory in a form of a software program. The processor executes the software program to implement a baseband processing function.

Figure 10:
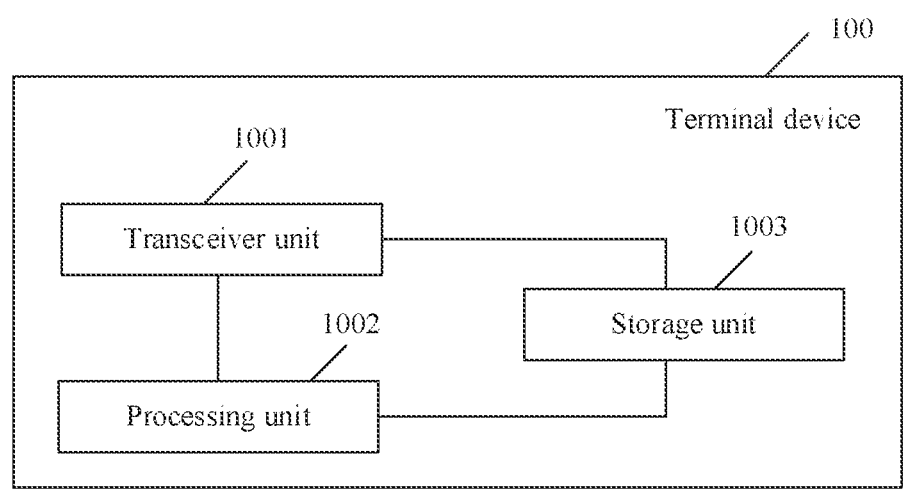
FIG. 10 is a schematic diagram of a structure of a terminal device according to an embodiment of this application.

In this embodiment of this application, the antenna and the control circuit that have receiving and sending functions may be considered as a transceiver unit 1001 of the terminal device 100, for example, may be configured to support the terminal device in performing a receiving function and a sending function. The processor 902 having a processing function is considered as a processing unit 1002 of the terminal device 100. The memory 903 is considered as a storage unit 1003. As shown in FIG. 10, the terminal device 100 includes the transceiver unit 1001 and the processing unit 1002. The transceiver unit may also be referred to as a transceiver, a transceiver machine, a transceiver apparatus, or the like. Optionally, a device configured to implement a receiving function in the transceiver unit 1001 may be considered as a receiving unit. A device configured to implement a sending function in the transceiver unit 1001 may be considered as a sending unit. In other words, the transceiver unit 1001 includes the receiving unit and the sending unit. The receiving unit may also be referred to as a receiving machine, an input port, a receiving circuit, or the like. The sending unit may be referred to as a transmitting machine, a transmitter, a transmitting circuit, or the like.

The processing unit 1002 may be configured to execute an instruction stored in the memory, to control the transceiver unit 1001 to receive a signal and/or transmit a signal, and implement functions of the terminal device in the foregoing method embodiments. The processing unit 1002 further includes an interface, configured to implement a signal input/output function. In an implementation, it may be considered that a function of the transceiver unit 1001 is implemented by using a transceiver circuit or a transceiver-dedicated chip.

Figure 11:
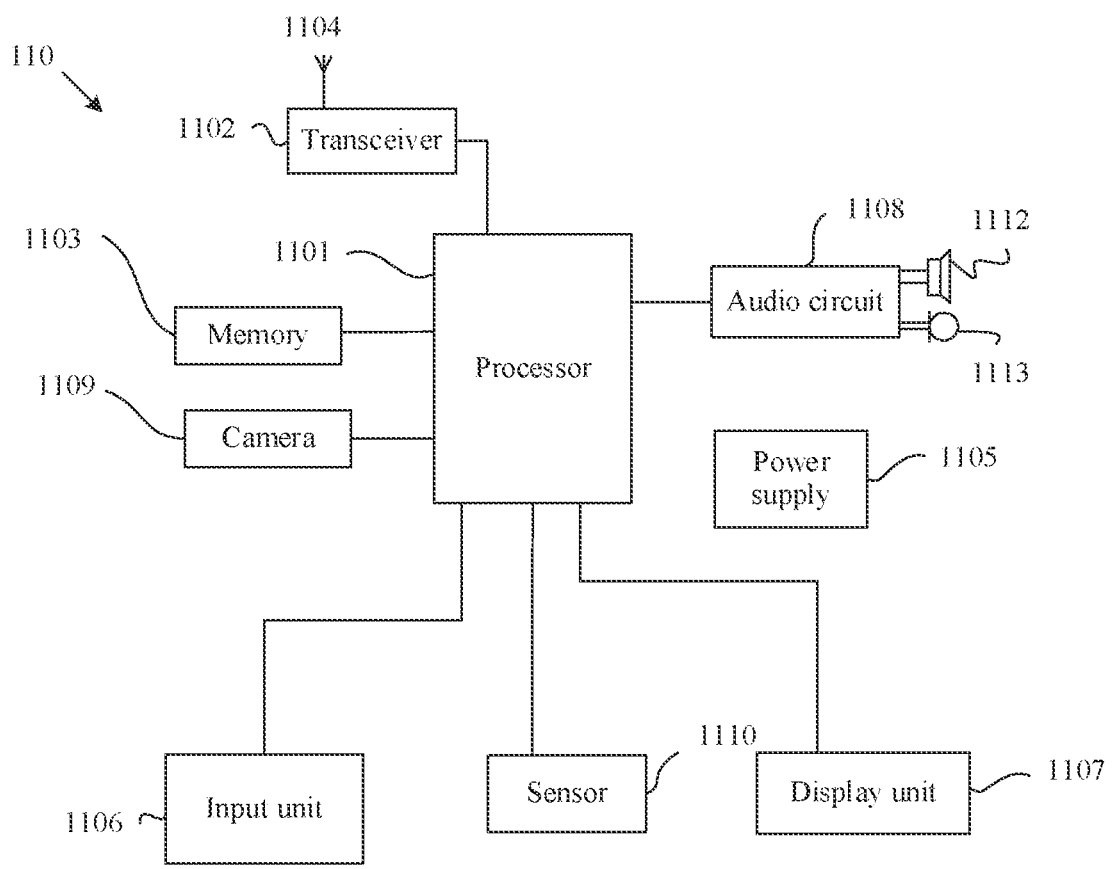
FIG. 11 is a schematic diagram of a structure of a terminal device according to an embodiment of this application.

FIG. 11 is a schematic diagram of another structure of a terminal device according to an embodiment of this application. As shown in FIG. 11, the terminal device 110 includes a processor 1101 and a transceiver 1102. Optionally, the terminal device 110 further includes a memory 1103. The processor 1101, the transceiver 1102, and the memory 1103 may communicate with each other through an internal connection path to transfer a control signal and/or a data signal. The memory 1103 is configured to store a computer program. The processor 1101 is configured to invoke the computer program from the memory 1103 and run the computer program, to control the transceiver 1102 to receive; send a signal. The terminal device 110 may further include an antenna 1104 that is configured to send, by using a radio signal, uplink data or uplink control signaling output by the transceiver 1102.

The processor 1101 and the memory 1103 may be integrated into one processing apparatus. The processor 1101 is configured to execute program code stored in the memory 1103 to implement the foregoing functions. During specific implementation, the memory 1103 may also be integrated into the processor 1101, or may be independent of the processor 1101.

Specifically, the terminal device 110 may correspond to the embodiments of the methods according to the embodiments of this application. In addition, units in the terminal device 110 and the foregoing other operations and/or functions are used to implement corresponding procedures in the embodiments of the methods.

The processor 1101 may be configured to perform actions implemented by one or more of the first communication apparatus and the second communication apparatus described in the foregoing method embodiments (in different communication, the terminal device may be the first communication apparatus or the second communication apparatus), and the transceiver 1102 may be configured to perform sending or receiving actions of one or more of the terminal device A, the terminal device B, and the terminal device C described in the foregoing method embodiments. For details, refer to the descriptions in the foregoing method embodiments. Details are not described herein.

Optionally, the terminal device 110 may further include a power supply 1105, configured to supply power to various devices or circuits in the terminal device.

In addition, to improve the functions of the terminal device, the terminal device 110 may further include one or more of an input unit 1106, a display unit 1107, an audio circuit 1108, a camera 1109, a sensor 1110, and the like, and the audio circuit may further include a speaker 1112, a microphone 1113, and the like.

Figure 12:
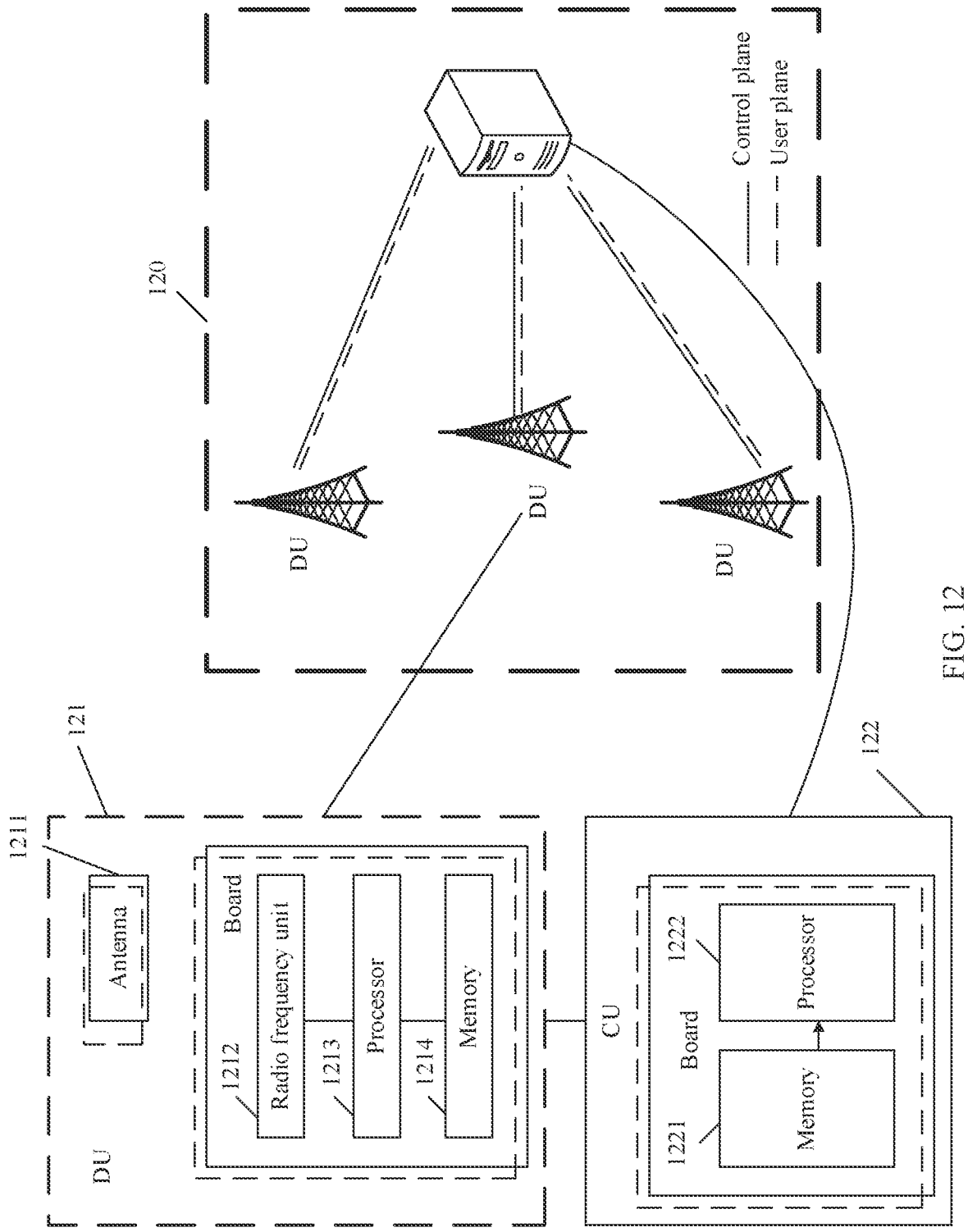
FIG. 12 is a schematic diagram of a structure of a network device according to an embodiment of this application.

FIG. 12 is a schematic diagram of a structure of a network device according to an embodiment of this application, tar example, may be a schematic diagram of a structure of a base station. As shown in FIG. 12, the base station may be used in the system shown in FIG. 2, to execute the function of the network device in the foregoing method embodiments. The base station 120 may include one or more distributed units (distributed units, DUs) 121 and one or more centralized units (centralized units, CUs) 122. The CU 122 may communicate with an NG core (next generation core, NC). The DU 121 may include at least one radio frequency unit 1212, at least one processor 1213, and at least one memory 1214. The DU 121 may further include at least one antenna 1211. The DU 121 is mainly configured to: receive and send a radio frequency signal, perform conversion between a radio frequency signal and a baseband signal, and perform partial baseband processing. The CU 122 may include at least one processor 1222 and at least one memory 1221. The CU 122 and the DU 121 may communicate with each other through an interface. A control plane (Control plane) interface may be Fs-C, for example, F1-C, and a user plane (User Plane) interface may be Fs-U, for example, F1-U.

The CU 122 is mainly configured to: perform baseband processing, control the base station, and the like. The DU 121 and the CU 122 may be physically disposed together, or may be physically disposed separately, to be specific, the base station is a distributed base station. The CU 122 is a control center of the base station, may also be referred to as a processing unit, and is mainly configured to complete a baseband processing function. For example, the CU 122 may be configured to control the base station to perform an operation procedure related to the network device in the foregoing method embodiments.

Specifically, baseband processing of the CU and the DU may be divided based on a protocol layer of a wireless network. For example, functions of a PDCP layer and a layer above the PDCP layer are set on the CU, and functions of protocol layers below the PDCP layer, such as an RLC layer and a MAC layer, are set on the DU. For another example, the CU implements functions of an RRC layer and a PDCP layer, and the DU implements functions of an RLC layer, a MAC layer, and a physical (physical, PHY) layer.

In addition, optionally (not shown in the figure), the base station 120 may include one or more antennas, one or more radio frequency units, one or more DUs, and one or more CUs. The DU may include at least one processor and at least one memory, the at least one antenna and the at least one radio frequency unit may be integrated into one antenna apparatus, and the CU may include at least one processor and at least one memory.

In an example, the CU 122 may include one or more boards, and a plurality of boards may jointly support a radio access network (for example, a 5G network) of a single access standard, or may separately support radio access networks (such as an LTE network, a 5G network, or another network) of different access standards. The memory 1221 and the processor 1222 may serve one or more boards. That is, the memory and the processor may be disposed individually on each board. Alternatively, a plurality of boards may share a same memory and a same processor. In addition, a necessary circuit may further be disposed on each board. The DU 121 may include one or more boards, and a plurality of boards may jointly support a radio access network (for example, a 5G network) of a single access standard, or may separately support radio access networks (such as an UE network, a 5G network, or another network) of different access standards. The memory 1214 and the processor 1213 may serve the one or more boards. That is, the memory and the processor may be disposed individually on each board. Alternatively, a plurality of boards may share a same memory and a same processor. In addition, a necessary circuit may further be disposed on each board.

Figure 13:
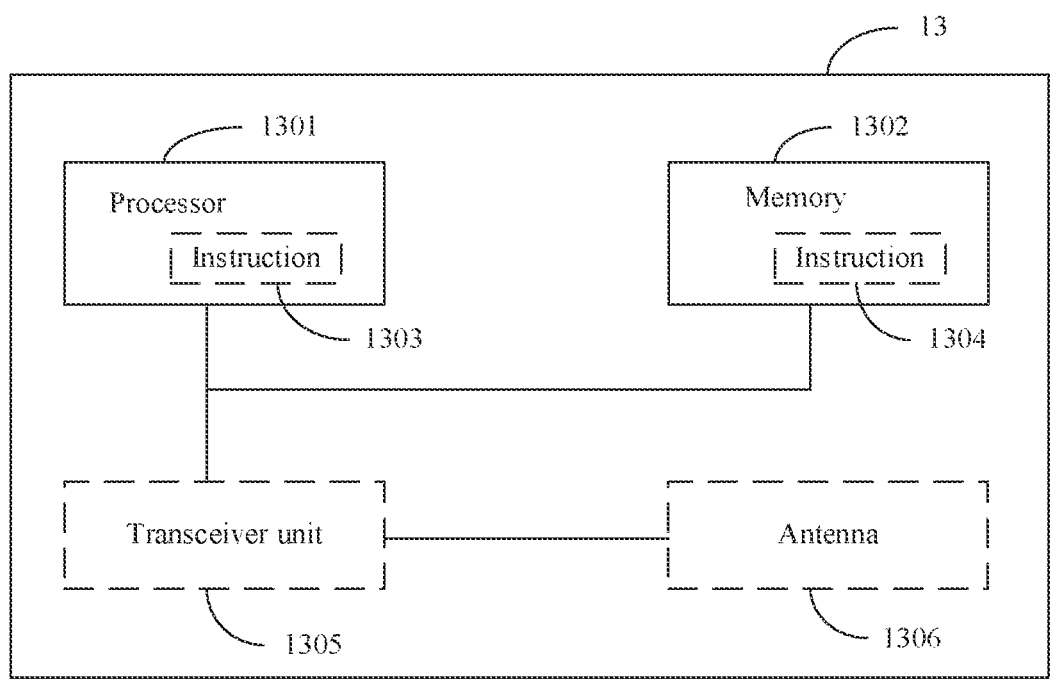
FIG. 13 is a schematic diagram of a structure of a network device according to an embodiment of this application.

FIG. 13 is a schematic diagram of a structure of a communication apparatus 13. The communication apparatus 13 may be configured to implement the method described in the foregoing method embodiments. Refer to the descriptions in the foregoing method embodiments. The communication apparatus 13 may be a chip, a network device (for example, a base station), or a terminal device.

The communication apparatus 13 includes one or more processors 1301. The processor 1301 may be a general-purpose processor, a dedicated processor, or the like. For example, the processor 1301 may be a baseband processor or a central processing unit. The baseband processor may be configured to process a communication protocol and communication data The central processing unit may be configured to: control the apparatus (for example, a base station, a terminal, or a chip), execute a software program, and process data of the software program. The apparatus may include a transceiver unit configured to input (receive) and output (send) a signal. For example, the apparatus may be a chip, and the transceiver unit may be an input and/or output circuit or a communication interface of the chip. The chip may be used for the terminal device or the network device (for example, the base station). For another example, the apparatus may be the terminal device or the network device (for example, the base station), and the transceiver unit may be a transceiver, a radio frequency chip, or the like.

The communication apparatus 13 includes one or more processors 1301, and the one or more processors 1301 may implement the method performed by the network device or the terminal device in the embodiments shown in FIG. 3 to FIG. 8.

In a possible design, the communication apparatus 13 includes a means (means) configured to receive scheduling information from the source network device, and a means (means) configured to send sidelink data based on the scheduling information. For example, the scheduling information may be received or the sidelink data may be sent by using a transceiver, an input/output circuit, or an interface of the chip. For the scheduling information, refer to related descriptions in the foregoing method embodiments.

In a possible design, the communication apparatus 13 includes a means (means) configured to determine scheduling information of the terminal device, and a means (means) configured to send the scheduling information to the terminal device. For details, refer to related descriptions in the foregoing method embodiments. For example, the scheduling information may be sent by using a transceiver, an input/output circuit, or an interface of the chip, and the scheduling information of the terminal device may be determined by using one or more processors.

In a possible design, the communication apparatus 13 includes a means (means) configured to receive scheduling information from a first terminal device, and a means (means) configured to receive sidelink data based on the scheduling information. For details, refer to related descriptions in the foregoing method embodiments. For example, the scheduling information and the sidelink data may be received by using a transceiver, an input/output circuit, or an interface of the chip.

Optionally, in addition to implementing the method in the embodiment shown in one or more of FIG. 3 to FIG. 8, the processor 1301 may further implement another function.

In an optional design, the processor 1301 may also include an instruction 1303. The instruction may be run on the processor, so that the communication apparatus 13 performs the methods described in the foregoing method embodiments.

In still another possible design, the communication apparatus 13 may include a circuit, and the circuit may implement the functions of the network device or the terminal device in the foregoing method embodiments.

In still another possible design, the communication apparatus 13 may include one or more memories 1302, on which an instruction 1304 is stored, and the instruction may be run on the processor, so that the communication apparatus 13 performs the method described in the foregoing method embodiments. Optionally, the memory may further store data. Optionally; the processor may also store instructions and/or data. For example, the one or more memories 1302 may store a mobile valid area described in the foregoing embodiments, or a related parameter, a table, or the like in the foregoing embodiments. The processor and the memory may be separately disposed, or may be integrated together.

In still another possible design, the communication apparatus 13 may further include a transceiver unit 1305 and an antenna 1306, or include a communication interface. The transceiver unit 1305 may be referred to as a transceiver machine, a transceiver circuit, a transceiver, or the like, and is configured to implement a transceiver function of the apparatus by using the antenna 1306. The communication interface (not shown in the figure) may be used for communication between a core network device and the network device, or communication between network devices. Optionally, the communication interface may be a wired communication interface, for example, an optical fiber communication interface.

The processor 1301 may be referred to as a processing unit, to control an apparatus (for example, the terminal or the base station).

In addition, because sending or receiving performed by the transceiver unit 1305 described in this embodiment of this application is under control of the processing unit (processor 1301), a sending or receiving action may also be described as being performed by the processing unit (processor 1301) in this embodiment of this application. This does not affect understanding of the solution by a person skilled in the art.

The terminal device and the network device in the foregoing apparatus embodiments may exactly correspond to the terminal device or the network device in the method embodiments, and a corresponding module or unit performs a corresponding step. For example, when the apparatus is implemented in a form of a chip, the receiving unit may be an interface circuit that is of the chip and that is configured to receive a signal from another chip or apparatus. The foregoing unit configured for sending is an interface circuit of the apparatus, and is configured to send a signal to another apparatus. For example, when the apparatus is implemented in the manner of the chip, the sending unit is an interface circuit that is of the chip and that is configured to send a signal from another chip or apparatus.

It should be understood that, the processor in the embodiments of this application may be a CPU, or may further be another general-purpose processor, a digital signal processor (digital signal processor, DSP), an application-specific integrated circuit (application-specific integrated circuit, ASIC), a field programmable gate array (field programmable gate array, FPGA), or another programmable logic device, a discrete gate or transistor logic device, a discrete hardware component, or the like.

It may be further understood that the memory in embodiments of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) and is used as an external cache. By way of example and not limitation, RAMs in many forms may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

The terminal device and the network device in the foregoing apparatus embodiments may exactly correspond to the terminal device or the network device in the method embodiments, and a corresponding module or unit performs a corresponding step. For example, when the apparatus is implemented in a form of a chip, the receiving unit may be an interface circuit that is of the chip and that is configured to receive a signal from another chip or apparatus. The foregoing unit configured for sending is an interface circuit of the apparatus, and is configured to send a signal to another apparatus. For example, when the apparatus is implemented in the manner of the chip, the sending unit is an interface circuit that is of the chip and that is configured to send a signal from another chip or apparatus.

An embodiment of this application further provides a communication system. The communication system includes the network device, the first terminal device, and the second terminal device. The first terminal device is equivalent to the first communication apparatus, and the second terminal device is equivalent to the second communication apparatus.

An embodiment of this application further provides a computer-readable medium, configured to store computer program code. The computer program includes instructions used to perform the method performed by the network device, the first communication apparatus, or the second communication apparatus in the communication method in the foregoing methods. The readable storage may a ROM or a RAM. This is not limited in this embodiment of this application.

This application further provides a computer program product. The computer program product includes instructions. When the instructions are executed, the terminal device A, the terminal device B, and the network device are enabled to respectively perform operations corresponding to the first communication apparatus, the second communication apparatus, and the network device in the foregoing methods.

An embodiment of this application further provides a system chip. The system chip includes a processing unit and a communication unit. The processing unit may be, for example, a processor, and the communication unit may be, for example, an input/output interface, a pin, a circuit, or the like. The processing unit may execute a computer instruction, so that a communication apparatus to which the chip is applied performs the operations of the first communication apparatus, the second communication apparatus, and the network device in the foregoing methods according to the embodiments of this application.

Optionally, any communication apparatus provided in the foregoing embodiments of this application may include the system chip.

Optionally, the computer instructions are stored in a storage unit.

Optionally, the storage unit is a storage unit in the chip, for example, a register or a cache. Alternatively, the storage unit may be a storage unit that is in the communication apparatus and that is located outside the chip, for example, a ROM, another type of static storage device that can store static information and instructions, or a RAM. Any aforementioned processor may be a CPU, a microprocessor, an ASIC, or one or more integrated circuits configured to control execution of a program for the foregoing feedback information transmission method. The processing unit and the storage unit may be decoupled, are separately disposed on different physical devices, and are connected in a wired or wireless manner to implement respective functions of the processing unit and the storage unit, to support the system chip in implementing various functions in the foregoing embodiments. Alternatively, the processing unit and the memory may be coupled to a same device. It should be understood that, in the embodiments of this application, the processor may be a CPU, or may be another general-purpose processor, a DSP, an ASIC, an FPGA or another programmable logic device, a discrete gate or transistor logic device, a discrete hardware component, or the like. The general-purpose processor may be a microprocessor, or the processor may be any conventional processor or the like.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

The foregoing descriptions about implementations allow a person skilled in the art to understand that, for the purpose of convenient and brief description, division of the foregoing function modules is taken as an example for illustration. During actual application, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiments are merely examples. For example, division of the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as discrete components may or may not be physically separate, and components displayed as units may be one or more physical units, that is, may be located in one place, or may be distributed to a plurality of different places. Some or all of the units may be selected based on an actual requirement to achieve an objective of the solutions of the embodiments.

In addition, function units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. An variation or replacement readily figured out by a person skilled in the art in the technical scope disclosed in this application shall fall within the protection scope of this application. Therefore, the protection scope of this application shall be subject to the protection scope of the claims.

What is claimed is:

1. A sidelink discontinuous reception (DRX) parameter configuration method implemented by a first communication apparatus, wherein the sidelink DRX parameter configuration method is applied to a device-to-device (D2D) communication scenario, and wherein the sidelink DRX parameter configuration method comprises:
   obtaining a sidelink DRX parameter, wherein the sidelink DRX parameter is used by the first communication apparatus to send data, on a sidelink based on the sidelink DRX parameter, to at least one second communication apparatus connected to the first communication apparatus;
   sending, to the at least one second communication apparatus, the sidelink DRX parameter;
   receiving sidelink resource information;
   determining based on the sidelink DRX parameter, the sidelink resource information, and a logical channel priority, a third communication apparatus in an active time of sidelink, which is one of the at least one second communication apparatus; and
   performing, based on the sidelink resource information, communication with the third communication apparatus.

2. The sidelink DRX parameter configuration method of claim 1, wherein determining the third communication apparatus comprises: determining, based on the sidelink DRX parameter and the sidelink resource information, at least one communication apparatus that is in the active time of sidelink within a time corresponding to the sidelink resource information among the at least one second communication apparatus, wherein the at least one communication apparatus comprises the third communication apparatus.

3. The sidelink DRX parameter configuration method of claim 2, wherein the third communication apparatus has a logical channel with a highest priority among the at least one communication apparatus being in the active time of sidelink within the time corresponding to the sidelink resource information.

4. The sidelink DRX parameter configuration method of claim 1, wherein obtaining the sidelink DRX parameter comprises receiving, from a network device, the sidelink DRX parameter, and wherein the first communication apparatus is located within a coverage area of the network device.

5. The sidelink DRX parameter configuration method of claim 4, wherein receiving the sidelink DRX parameter further comprises receiving, from the network device, a configuration message comprising the sidelink DRX parameter and an identifier of the at least one second communication apparatus.

6. The sidelink DRX parameter configuration method of claim 1, wherein obtaining the sidelink DRX parameter comprises determining, based on a data transmission requirement of the first communication apparatus on a sidelink, the sidelink DRX parameter of the at least one second communication apparatus.

7. The sidelink DRX parameter configuration method of claim 6, further comprising sending, to a network device, the sidelink DRX parameter and an identifier of the at least one second communication apparatus.

8. The sidelink DRX parameter configuration method of claim 6, wherein the data transmission requirement is quality of service (QoS) for a service of the first communication apparatus on the sidelink.

9. The sidelink DRX parameter configuration method of claim 1, wherein sending the sidelink DRX parameter comprises sending, to the at least one second communication apparatus, a configuration message comprising the sidelink DRX parameter.

10. The sidelink DRX parameter configuration method of claim 1, further comprising:
    storing the sidelink DRX parameter; and
    establishing a correspondence between the sidelink DRX parameter and an identifier of the at least one second communication apparatus.

11. The sidelink DRX parameter configuration method of claim 1, wherein receiving the sidelink resource information comprises receiving, from a network device, downlink control information (DCI) comprising the sidelink resource information and that is allocated to the first communication apparatus.

12. The sidelink DRX parameter configuration method of claim 1, wherein the sidelink DRX parameter comprises at least one of sidelink DRX-onDurationTimer, sidelink DRX-SlotOffset, sidelink DRX-InactivityTimer, sidelink DRX-RetransmissionTimer, sidelink DRX-ShortCycle, sidelink DRX-ShortCycleTimer, or sidelink DRX-HARQ-RTT-Timer.

13. The sidelink DRX parameter configuration method of claim 1, wherein the active time of sidelink comprises:
    sidelink DRX-onDurationTimer or sidelink DRX-InactivityTimer comprised in the sidelink DRX parameter is running;
    sidelink DRX-RetransmissionTimer comprised in the sidelink DRX parameter running; or
    ra-ContentionResolutionTimer comprised in the sidelink DRX parameter running; or wherein the second communication apparatus has sent a scheduling request (SR) on a physical uplink control channel (PUCCH) and the SR is currently in a pending state.

14. The sidelink DRX parameter configuration method of claim 1, wherein the first communication apparatus is a first terminal device or a first communication chip, and wherein the at least one second communication apparatus is a second terminal device or a second communication chip.

15. A sidelink discontinuous reception (DRX) parameter configuration method implemented by a network device, wherein the sidelink DRX parameter configuration method is applied to a device-to-device (D2D) communication scenario, and wherein the sidelink DRX parameter configuration method comprises:
- determining a sidelink DRX parameter, wherein the sidelink DRX parameter is used by a first communication apparatus to send data, on a sidelink based on the sidelink DRX parameter, to at least one second communication apparatus connected to the first communication apparatus;
- sending, to the first communication apparatus, the sidelink DRX parameter; and
- sending, to the first communication apparatus, sidelink resource information,
- wherein the sidelink resource information enables the first communication apparatus based on the sidelink DRX parameter, the sidelink resource information, and a logical channel priority, to determine a third communication apparatus that is in an active time of sidelink, which is one of the at least one second communication apparatus and to perform communication with the third communication apparatus based on the sidelink resource information.

16. The sidelink DRX parameter configuration method of claim 15, wherein sending sidelink DRX parameter comprises sending, to the first communication apparatus, a configuration message comprising the sidelink DRX parameter and an identifier of the at least one second communication apparatus.

17. The sidelink DRX parameter configuration method of claim 15, wherein the first communication apparatus is a terminal device or a communication chip, and the second communication apparatus is a terminal device or a communication chip.

18. A first communication apparatus applied to a device-to-device (D2D) communication scenario and comprising:
- a memory configured to store instructions; and
- a processor coupled to the memory and configured to execute the instructions to cause the first communication apparatus to:
  - obtain a sidelink discontinuous reception (DRX) parameter, wherein the sidelink DRX parameter is used by the first communication apparatus to send data, on a sidelink based on the sidelink DRX parameter, to at least one second communication apparatus connected to the first communication apparatus;
  - send, to the at least one second communication apparatus, the sidelink DRX parameter;
  - receive sidelink resource information;
  - determine, based on the sidelink DRX parameter the sidelink resource information, and a logical channel priority, a third communication apparatus in an active time of sidelink, which is one of the at least one second communication apparatus; and
  - perform, based on the sidelink resource information, communication with the third communication apparatus.

19. The sidelink DRX parameter configuration method of claim 4, wherein before receiving the sidelink DRX parameter, obtaining the sidelink DRX parameter further comprises sending assistance information and an identifier of the at least one second communication apparatus to the network device, wherein the assistance information is used to determine the sidelink DRX parameter.

20. The sidelink DRX parameter configuration method of claim 15, wherein before determining the sidelink DRX parameter, the method further comprises receiving assistance information and an identifier of the at least one second communication apparatus from the first communication apparatus, wherein the assistance information is used to determine the sidelink DRX parameter, and wherein the first communication apparatus is located within a coverage area of the network device.

* * * * *